United States Patent
Mu et al.

(10) Patent No.: US 12,346,292 B2
(45) Date of Patent: Jul. 1, 2025

(54) FILE SHARING METHOD, DEVICE, AND SYSTEM

(71) Applicant: DIGITAL CURRENCY INSTITUTE, THE PEOPLE'S BANK OF CHINA, Beijing (CN)

(72) Inventors: Changchun Mu, Beijing (CN); Gang Di, Beijing (CN); Youcai Qian, Beijing (CN); Sude Qing, Beijing (CN); Qingjie Chen, Beijing (CN); Jinzhao Du, Beijing (CN)

(73) Assignee: DIGITAL CURRENCY INSTITUTE, THE PEOPLE'S BANK OF CHINA, Beijing (CN)

(*) Notice: Subject to any disclaimer, the term of this patent is extended or adjusted under 35 U.S.C. 154(b) by 0 days.

(21) Appl. No.: 18/040,467

(22) PCT Filed: Aug. 4, 2021

(86) PCT No.: PCT/CN2021/110599
§ 371 (c)(1),
(2) Date: Feb. 3, 2023

(87) PCT Pub. No.: WO2022/028486
PCT Pub. Date: Feb. 10, 2022

(65) Prior Publication Data
US 2024/0330242 A1    Oct. 3, 2024

(30) Foreign Application Priority Data

Aug. 4, 2020 (CN) .......... 202010772425.X
Aug. 4, 2020 (CN) .......... 202010772432.X
(Continued)

(51) Int. Cl.
G06F 16/00 (2019.01)
G06F 16/174 (2019.01)
G06F 16/176 (2019.01)
H04L 9/00 (2022.01)
H04L 9/06 (2006.01)

(52) U.S. Cl.
CPC ........ *G06F 16/176* (2019.01); *G06F 16/1744* (2019.01); *H04L 9/0643* (2013.01); *H04L 9/50* (2022.05)

(58) Field of Classification Search
CPC .. G06F 21/64; G06F 11/1464; G06F 16/2219; G06F 16/2255; G06F 16/2322;
(Continued)

(56) References Cited

U.S. PATENT DOCUMENTS

2017/0243176 A1* 8/2017 Hanke ................ G06Q 20/0655
2017/0364699 A1* 12/2017 Goldfarb ............. G06F 16/2455
(Continued)

FOREIGN PATENT DOCUMENTS

CN    106815530 A    6/2017
CN    107633088 A    1/2018
(Continued)

OTHER PUBLICATIONS

State Intellectual Property Office of China, Office Action Received for Chinese Patent Application No. 202010773252.3, issued May 30, 2023, 6 pages.
(Continued)

*Primary Examiner* — Shyue Jiunn Hwa
(74) *Attorney, Agent, or Firm* — Stoel Rives LLP

(57) ABSTRACT

The disclosure relates to a method, apparatus and system for sharing files, and mainly relates to the technical field of computers. One specific implementation mode of the method comprises: acquiring files to be shared, and uploading, on a blockchain, formed compressed file packages; generating by calculation a root hash value in accordance with file names of the compressed packages and hash values thereof; and acquiring respective compressed file packages in a blockchain in accordance with the root hash value. The technical problem of an excessive burden of network
(Continued)

resources caused by a large number of files is partially overcome by compressing a plurality of files into compressed file packages, and the file uploading and sharing efficiencies are increased by uploading the respective compressed file packages on the blockchain concurrently; the files are stored or updated, and the root hash value is shared by using data structures such as a binary tree structure, a multi-way tree structure, and a dynamic tree structure to acquire, by the root hash value and respective node hash values, the shared files, which improves the security of the files.

18 Claims, 23 Drawing Sheets

(30) Foreign Application Priority Data

Aug. 4, 2020 (CN) .......................... 202010772434.9
Aug. 4, 2020 (CN) .......................... 202010773252.3

(58) Field of Classification Search
CPC ............. G06F 16/2365; G06F 16/2379; G06F 16/275; G06F 16/9014; G06F 21/564; G06F 21/6227; G06F 21/645; G06F 2201/84; G06F 2201/87; G06F 2221/2137; G06F 2221/2141; G06F 2221/2149; G06F 16/1744; G06F 16/176; G06F 16/1767; G06F 21/602; G06Q 20/3827; G06Q 20/389; H04L 9/50; H04L 2209/56; H04L 9/3236; H04L 63/12; H04L 9/3239; H04L 9/3247; H04L 63/0823; H04L 2209/30
See application file for complete search history.

(56) References Cited

U.S. PATENT DOCUMENTS

| | | | |
|---|---|---|---|
| 2018/0101701 A1 | 4/2018 | Barinov et al. | |
| 2019/0068615 A1* | 2/2019 | Pack | ........................ H04L 9/30 |
| 2019/0197174 A1 | 6/2019 | Kim et al. | |
| 2019/0332921 A1 | 10/2019 | Rodriguez | |
| 2020/0076613 A1 | 3/2020 | Ciscato et al. | |
| 2020/0112437 A1 | 4/2020 | Nakamura et al. | |
| 2020/0304290 A1* | 9/2020 | Coulmeau | ............. G06F 21/645 |
| 2021/0233192 A1* | 7/2021 | Manamohan | ......... H04L 9/3236 |
| 2021/0256013 A1 | 8/2021 | Yang | |
| 2022/0191037 A1* | 6/2022 | Hassanzadeh Nazarabadi ............ G06Q 20/401 |

FOREIGN PATENT DOCUMENTS

| | | |
|---|---|---|
| CN | 108667836 A | 10/2018 |
| CN | 109101572 A | 12/2018 |
| CN | 109657499 A | 4/2019 |
| CN | 109684871 A | 4/2019 |
| CN | 109903049 A | 6/2019 |
| CN | 110020544 A | 7/2019 |
| CN | 110032581 A | 7/2019 |
| CN | 110347645 A | 10/2019 |
| CN | 110516206 A | 11/2019 |
| CN | 110599174 A | 12/2019 |
| CN | 110941672 A | 3/2020 |
| CN | 110998558 A | 4/2020 |
| CN | 111209262 A | 5/2020 |
| CN | 111259070 A | 6/2020 |
| CN | 111984612 A | 11/2020 |
| CN | 111984613 A | 11/2020 |
| CN | 111984614 A | 11/2020 |
| CN | 111984616 A | 11/2020 |
| JP | 6626228 B1 | 12/2019 |
| WO | 2018070783 A2 | 4/2018 |
| WO | 2020134628 A1 | 7/2020 |

OTHER PUBLICATIONS

International Search Report and Written Opinion received in International PCT Application No. PCT/CN2021/110599, mailed Nov. 11, 2021, 11 pages.

European Patent Office, Extended European Search Report for European Patent Application No. 21852328.0, mailed Oct. 15, 2024, 14 pages.

* cited by examiner

FILE SHARING METHOD, DEVICE, AND SYSTEM

The application claims priorities to CN Patent Application No. 202010772432.X, entitled "Method, Apparatus and System for Sharing Files", which was filed on Aug. 4, 2020, CN Patent Application No. 202010772434.9, entitled "Method, Apparatus and System for Sharing Files", which was filed on Aug. 4, 2020, CN Patent Application No. 202010772425.X, entitled "Method, Apparatus and System for Sharing Files", which was filed on Aug. 4, 2020, and CN Patent Application No. 202010773252.3, entitled "Method, Apparatus and System for Sharing Files", which was filed on Aug. 4, 2020, and the contents of which are hereby incorporated by reference in their entirety to serve as part of the application.

TECHNICAL FIELD

The disclosure relates to the technical field of computers, and in particular relates to a method, apparatus and system for sharing files.

BACKGROUND

In a service flow of an enterprise, it is generally required to share files required by a service, in particular when a service between enterprises is involved. With the development of blockchain technology, enterprises may share files based on a blockchain, and the main methods adopted are as follows: 1. using all the shared files as transactions to be uploaded and broadcasted to achieve sharing, 2. saving the files in a centralized database, and uploading and broadcasting electronic certificates of the files to achieve sharing.

In the process of implementing the disclosure, the inventor has found at least the following problems existing in the prior art:

If the method 1 is used, when the number of files is comparatively large, the usage rate of network resources is too high, which leads to a decrease in the file uploading efficiency; if the method 2 is used, a centralized database is used to save files, and when the files have a comparatively high security, a certain security risk will exist.

SUMMARY

In view of this, a first embodiment of the disclosure provides a method and apparatus for sharing files, which are capable of acquiring files to be shared, and forming at least two compressed file packages; uploading, on a blockchain, the at least two compressed file packages, and acquiring at least two first hash values respectively corresponding to the at least two compressed file packages from the blockchain; using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and using the current hash value as a root hash value, and sending the root hash value; the hash values on the respective levels forming a binary tree structure. Two current hash values are acquired in accordance with the root hash value, and executions are made in a loop until a compressed file package corresponding to each of the current hash values is acquired; then shared files in the compressed file package are acquired; since a technical means of compressing a plurality of files into file packages is adopted, the technical problem of an excessive network resource burden caused by a large number of files is partially overcome, and the file uploading and sharing efficiencies are improved by uploading the respective compressed file packages concurrently; the hash values are stored using the binary tree structure, and a root hash value is shared to thereby acquire the shared files, which improves the security of the shared files.

In order to achieve the aforesaid object, according to a first aspect of the first embodiment of the disclosure, a method for sharing files is provided, characterized in that the method comprises: acquiring files to be shared, and forming at least two compressed file packages; uploading, on a blockchain, the at least two compressed file packages, and acquiring at least two first hash values respectively corresponding to the at least two compressed file packages from the blockchain; using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and using the current hash value as a root hash value, and sending the root hash value.

In order to achieve the aforesaid object, according to a second aspect of the first embodiment of the disclosure, a method for sharing files is provided, characterized in that the method comprises: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining two lower-level hash values corresponding to the current hash value, and using the lower-level hash values as the current hash values.

In order to achieve the aforesaid object, according to a third aspect of the first embodiment of the disclosure, an apparatus for sharing files is provided, characterized in that the apparatus comprises: a compressed file package uploading module, a node hash value acquiring module and a root hash value acquiring module; wherein, the compressed file package uploading module is used for acquiring files to be shared, and forming at least two compressed file packages; uploading, on a blockchain, the at least two compressed file packages, and acquiring at least two first hash values respectively corresponding to the at least two compressed file packages from the blockchain;

the node hash value acquiring module is used for using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and the root hash value acquiring module is used for using the current hash value as a root hash value, and sending the root hash value.

In order to achieve the aforesaid object, according to a fourth aspect of the first embodiment of the disclosure, an apparatus for sharing files is further provided, characterized in that the apparatus comprises: a shared file acquiring module; wherein, the shared file acquiring module is used for receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining two lower-level hash values corresponding to the current hash value, and using the lower-level hash values as the current hash values.

In order to achieve the aforesaid object, according to a fifth aspect of the first embodiment of the disclosure, a system for sharing files 900 is provided, the system comprising an apparatus for sharing files 700 provided by the aforesaid third aspect, and an apparatus for sharing files 800 provided by the aforesaid fourth aspect.

In order to achieve the aforesaid object, according to a sixth aspect of the first embodiment of the disclosure, a file sharing electronic device is provided, characterized in that the electronic device comprises: one or more processors; and a storage means for storing one or more programs, the one or more programs, when executed by the one or more processors, causing the one or more processors to implement any of the methods for sharing files as stated above.

In order to achieve the aforesaid object, according to a seventh aspect of the first embodiment of the disclosure, a computer-readable medium is provided, on which medium a computer program is stored, characterized in that the program, when executed by a processor, implements any of the methods for sharing files as stated above.

The aforesaid first embodiment of the disclosure has the following advantages or beneficial effects: acquiring files to be shared, and forming at least two compressed file packages; uploading, on a blockchain, the at least two compressed file packages, and acquiring at least two first hash values respectively corresponding to the at least two compressed file packages from the blockchain; using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and using the current hash value as a root hash value, and sending the root hash value; the hash values on the respective levels forming a binary tree structure.

Two current hash values are acquired in accordance with the root hash value, and executions are made in a loop until a compressed file package corresponding to each of the current hash values is acquired; then shared files in the compressed file package are acquired. Since a technical means of compressing a plurality of files into file packages is adopted, the technical problem of an excessive network resource burden caused by a large number of files is partially overcome, and the file uploading and sharing efficiencies are improved by uploading the respective compressed file packages concurrently; the hash values are stored using the binary tree structure, and a root hash value is shared to thereby acquire the shared files, which improves the security of the shared files.

A second embodiment of the disclosure provides a method and apparatus for sharing files, which are capable of acquiring files to be shared, and forming compressed file packages; uploading, on a blockchain, the compressed file packages, and acquiring corresponding first hash values; selecting a set number of first hash values to be uploaded and acquiring current hash values; acquiring corresponding first hash values; making executions in a loop until a root hash value is acquired, the current hash values on the respective levels being stored by a bifurcated tree structure having a set number of ways. Based on the root hash value, the hash values of the nodes of the bifurcated tree structure are traversed, and shared files in the compressed file packages are acquired; by compressing a plurality of files into compressed file packages, the technical problem of an excessive network resource burden caused by a large number of files is partially overcome, and the file uploading and sharing efficiencies are improved by uploading the respective compressed file packages on the blockchain concurrently; the root hash value is stored and shared using the bifurcated tree structure, and the shared files are acquired by the root hash value, which improves the security of the files.

In order to achieve the aforesaid object, according to a first aspect of the second embodiment of the disclosure, a method for sharing files is provided, characterized in that the method comprises: acquiring files to be shared, and forming a plurality of compressed file packages; uploading, on a blockchain, the compressed file packages, and acquiring at least three first hash values corresponding to the compressed file packages from the blockchain; using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2; and using the current hash value as a root hash value, and sending the root hash value.

In order to achieve the aforesaid object, according to a second aspect of the second embodiment of the disclosure, a method for sharing files is provided, characterized in that the method comprises: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

In order to achieve the aforesaid object, according to a third aspect of the second embodiment of the disclosure, an apparatus for sharing files is provided, characterized in that the apparatus comprises: a compressed file package uploading module, a node hash value acquiring module and a root hash value acquiring module; wherein, the compressed file package uploading module is used for acquiring files to be shared, and forming a plurality of compressed file packages; uploading, on a blockchain, the compressed file packages, and acquiring at least three first hash values corresponding to the compressed file packages from the blockchain;

the node hash value acquiring module is used for using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2; and the root hash value acquiring module is used for using the current hash value as a root hash value, and sending the root hash value.

In order to achieve the aforesaid object, according to a fourth aspect of the second embodiment of the disclosure, an apparatus for sharing files is further provided, characterized in that the apparatus comprises: an on-chain file acquiring module; wherein, the on-chain file acquiring module is used for receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

In order to achieve the aforesaid object, according to a fifth aspect of the second embodiment of the disclosure, a system for sharing files is provided, the system comprising an apparatus for sharing files provided by the aforesaid third aspect of the second embodiment, and an apparatus for sharing files provided by the aforesaid fourth aspect of the second embodiment.

In order to achieve the aforesaid object, according to a sixth aspect of the second embodiment of the disclosure, a file sharing electronic device is provided, characterized in that the electronic device comprises: one or more processors; and a storage means for storing one or more programs, the one or more programs, when executed by the one or more processors, causing the one or more processors to implement any of the methods for sharing files as stated above.

In order to achieve the aforesaid object, according to a seventh aspect of the second embodiment of the disclosure, a computer-readable medium is provided, on which medium a computer program is stored, characterized in that the program, when executed by a processor, implements any of the methods for sharing files as stated above.

The aforesaid second embodiment of the disclosure has the following advantages or beneficial effects: acquiring files to be shared, and forming compressed file packages; uploading, on a blockchain, the compressed file packages, and acquiring corresponding first hash values; selecting a set number of first hash values to be uploaded and acquiring current hash values; making executions in a loop until a root hash value is acquired, the current hash values on the respective levels being stored by a bifurcated tree structure having a set number of ways. Based on the root hash value, the hash values of the nodes of the bifurcated tree structure are traversed, and shared files in the compressed file packages are acquired; by compressing a plurality of files into compressed file packages, the technical problem of an excessive network resource burden caused by a large number of files is partially overcome, and the file uploading and sharing efficiencies are improved by uploading the respective compressed file packages concurrently; the root hash value is stored and shared using the bifurcated tree structure, and the shared files are acquired by the root hash value, which improves the security of the files.

A third embodiment of the disclosure provides a method and apparatus for sharing files, acquiring files to be shared, uploading, on a blockchain, compressed file packages within a set period and dynamically grouping compressed file package hash values, and uploading each group of the compressed file packages on the blockchain and acquiring current hash values; making executions in a loop until a root hash value is acquired, the hash values on the respective levels forming a bifurcated tree structure having a dynamically variable number of leaves. Based on the root hash value, the hash values in the bifurcated tree structure are traversed, and shared files in the compressed file packages are acquired; by compressing a plurality of files into compressed file packages, the technical problem of an excessive network resource burden caused by a large number of files is partially overcome, and the file uploading and sharing efficiencies are improved by uploading the respective compressed file packages concurrently; the root hash value is stored and shared using the bifurcated tree structure, and the shared files are acquired by the root hash value, which improves the security of the files.

In order to achieve the aforesaid object, according to a first aspect of the third embodiment of the disclosure, a method for sharing files is provided, characterized in that the method comprises: acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain; generating intermediate hash values based on the first hash values included in each group, uploading each of the intermediate hash values on the blockchain, and respectively acquiring second hash values from the blockchain; using the second hash values as current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1; and using the current hash value as a root hash value, and sending the root hash value.

In order to achieve the aforesaid object, according to a second aspect of the third embodiment of the disclosure, a method for sharing files is provided, characterized in that the method comprises: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

In order to achieve the aforesaid object, according to a third aspect of the third embodiment of the disclosure, an apparatus for sharing files is provided, characterized in that the apparatus comprises: a compressed file package uploading module, a current hash value acquiring module and a root hash value acquiring module; wherein, the compressed file package uploading module is used for acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain;

the current hash value acquiring module is used for generating intermediate hash values based on the first hash values included in each group, uploading the intermediate hash values on the blockchain, and respectively acquiring second hash values from the blockchain; using the second hash values as current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1; and the root hash value acquiring module is used for using the current hash value as a root hash value, and sending the root hash value.

In order to achieve the aforesaid object, according to a fourth aspect of the third embodiment of the disclosure, an apparatus for sharing files is further provided, characterized in that the apparatus comprises: an on-chain file acquiring module; wherein, the on-chain file acquiring module is used for receiving a current hash value; executing the following steps in a loop until a compressed file package corresponding to the current hash value is acquired:

determining whether there is a compressed file package hash value the same as the current hash value on a blockchain, if so, performing step A1; otherwise, performing step A2;

step A1: acquiring the compressed file package corresponding to the current hash value from the blockchain; and step A2: determining respective lower-level hash values corresponding to the current hash value, and using the lower-level hash values as the current hash values.

In order to achieve the aforesaid object, according to a fifth aspect of the third embodiment of the disclosure, a system for sharing files is provided, the system comprising an apparatus for sharing files provided by the aforesaid third aspect of the third embodiment, and an apparatus for sharing files provided by the aforesaid fourth aspect of the third embodiment.

In order to achieve the aforesaid object, according to a sixth aspect of the third embodiment of the disclosure, a file sharing electronic device is provided, characterized in that the electronic device comprises: one or more processors; and a storage means for storing one or more programs, the one or more programs, when executed by the one or more processors, causing the one or more processors to implement any of the methods for sharing files as stated above.

In order to achieve the aforesaid object, according to a seventh aspect of the third embodiment of the disclosure, a computer-readable medium is provided, on which medium a computer program is stored, characterized in that the program, when executed by a processor, implements any of the methods for sharing files as stated above.

The aforesaid third embodiment of the disclosure has the following advantages or beneficial effects: acquiring files to be shared, uploading, on a blockchain, compressed file packages within a set period and grouping first hash values acquired from the blockchain, and executing a blockchain uploading operation in accordance with each group of first hash values and acquiring current hash values; making executions in a loop until a root hash value is acquired, the hash values on the respective levels forming a bifurcated tree structure. Based on the root hash value, the hash values in the bifurcated tree structure are traversed, and shared files in the compressed file packages are acquired; by compressing a plurality of files into compressed file packages, the technical problem of an excessive network resource burden caused by a large number of files is partially overcome, and the file uploading and sharing efficiencies are improved by uploading the respective compressed file packages on the blockchain concurrently; the root hash value is stored and shared using the bifurcated tree structure, and the shared files are acquired by the root hash value, which improves the security of the files.

A fourth embodiment of the disclosure provides a method and apparatus for sharing files, which are capable of uploading the replaced compressed file packages and acquiring corresponding new hash values by partially replacing shared files stored on a blockchain and stored in a tree-shaped structure; executing operations in a loop on the new hash values and the associated hash values in the tree-shaped structure, and acquiring a new root hash value; by means of the new root hash value, the hash values of the nodes of the tree structure are traversed, and then a shared updated file is acquired; the problem of re-uploading relevant nodes and file certificates on the blockchain caused by updating a small number of files is partially overcome, a burden of network resources is lightened, and the shared-file updating efficiency is improved.

In order to achieve the aforesaid object, according to a first aspect of the fourth embodiment of the disclosure, a method for sharing files is provided, characterized in that the method comprises: acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain; using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position; and using the fourth hash value on the highest level as a new root hash value, and sending the new root hash value.

In order to achieve the aforesaid object, according to a second aspect of the fourth embodiment of the disclosure, a method for updating shared files is provided, characterized in that the method comprises:

receiving a root hash value; determining a sub-hash value corresponding to the root hash value; executing the following steps in a loop until a compressed file package corresponding to the sub-hash value is acquired, the compressed file package including an updated file: determining whether there is a compressed file package hash value the same as the sub-hash value on a blockchain, if so, performing step A1; otherwise, performing step A2;

step A1: acquiring the compressed file package corresponding to the sub-hash value from the blockchain; and step A2: determining lower-level hash values corresponding to the sub-hash value, and using the lower-level hash values as the sub-hash values.

In order to achieve the aforesaid object, according to a third aspect of the fourth embodiment of the disclosure, an apparatus for updating shared files is provided, characterized in that the apparatus comprises: a file updating module, a hash value updating module and a root hash value updating module; wherein, the file updating module is used for acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain;

the hash value updating module is used for using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position; and the root hash value updating module is used for using the fourth hash value on the highest level as a new root hash value, and sending the new root hash value.

In order to achieve the aforesaid object, according to a fourth aspect of the fourth embodiment of the disclosure, an apparatus for updating shared files is further provided, characterized in that the apparatus comprises: an updated file acquiring module; wherein, the updated file acquiring module is used for receiving a root hash value; determining a sub-hash value corresponding to the root hash value; executing the following steps in a loop until a compressed file package corresponding to the sub-hash value is acquired: determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

In order to achieve the aforesaid object, according to a fifth aspect of the fourth embodiment of the disclosure, a system for sharing files is provided, the system comprising an apparatus for updating shared files provided by the aforesaid third aspect of the fourth embodiment, and an apparatus for updating shared files provided by the aforesaid fourth aspect of the fourth embodiment.

In order to achieve the aforesaid object, according to a sixth aspect of the fourth embodiment of the disclosure, a shared file updating electronic device is provided, characterized in that the electronic device comprises: one or more processors; and a storage means for storing one or more programs, the one or more programs, when executed by the one or more processors, causing the one or more processors to implement any of the methods for sharing files as stated above.

In order to achieve the aforesaid object, according to a seventh aspect of the fourth embodiment of the disclosure, a computer-readable medium is provided, on which medium a computer program is stored, characterized in that the program, when executed by a processor, implements any of the methods for updating shared files as stated above.

The aforesaid fourth embodiment of the disclosure has the following advantages or beneficial effects: uploading the replaced compressed file packages and acquiring corresponding new hash values by partially replacing shared files stored on a blockchain and stored in a tree-shaped structure; executing operations in a loop on the new hash values and the associated hash values in the tree-shaped structure, and acquiring a new root hash value; by means of the new root hash value, the hash values of the nodes of the tree structure are traversed, and then a shared updated file is acquired; the problem of re-uploading relevant nodes and file certificates on the blockchain caused by updating a small number of files is partially overcome, a burden of network resources is lightened, and the shared-file updating efficiency is improved.

Further effects of the aforesaid non-conventional optional manners will be described below in combination with specific implementation modes.

BRIEF DESCRIPTION OF THE DRAWINGS

Drawings are used to better understand the disclosure, and do not form improper limitations of the disclosure. Where.

DETAILED DESCRIPTION

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

Figure 1:
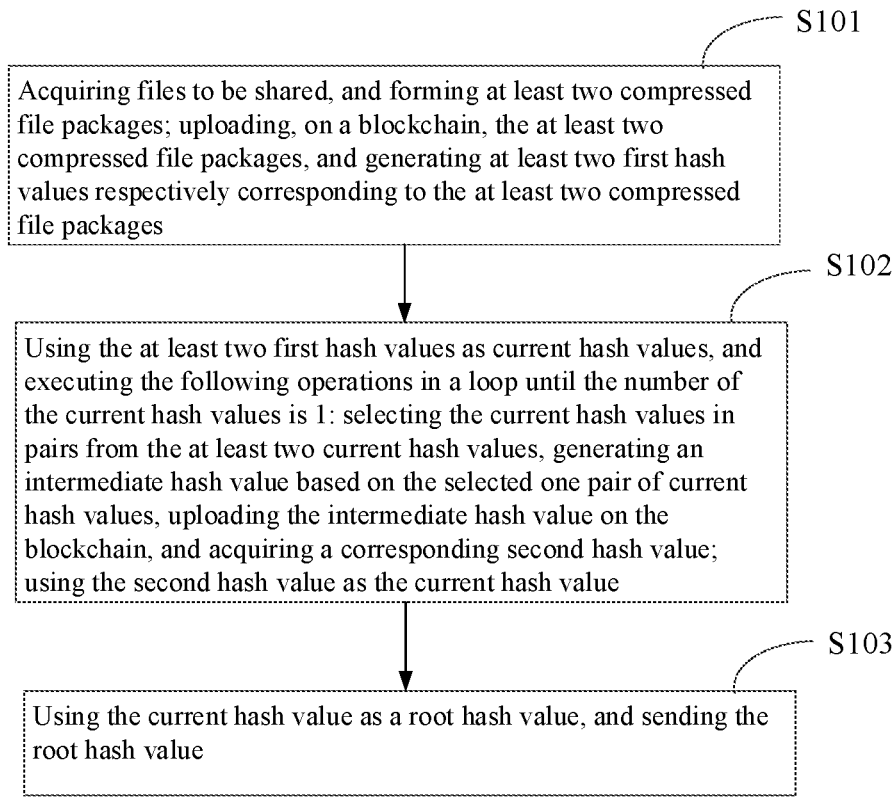
FIG. 1 is a schematic diagram of a flow of a method for storing shared files provided by the first embodiment of the disclosure.

As shown in FIG. 1, the first embodiment of the disclosure provides a method for storing shared files, and the method may comprise the following steps:

Step S101: acquiring files to be shared, and forming at least two compressed file packages; uploading, on a blockchain, the at least two compressed file packages, and acquiring at least two first hash values respectively corresponding to the at least two compressed file packages from the blockchain.

Specifically, the files to be shared are transaction files produced by an electronic bank, statement files produced by an electronic bank, order files generated by an electronic mall, and so on; further, the step of acquiring files to be shared, and forming at least two compressed file packages comprises: acquiring files to be shared within a predefined time range, forming at least two file packages, and determining the number of files in the file packages in accordance with a network bandwidth. Specifically, the predefined time range may be determined in accordance with the number of shared files received within a time range, so as to form a reasonable number of received files in accordance with the time range, for example, transaction files produced by an electronic bank within one hour, statement files produced by two electronic banks within one hour, order files produced by an electronic mall within one day, and so on, and the predefined time range may be set in accordance with the service scenario and the number of the produced files, for example, one day, one hour, one minute, and so on.

Further, the files to be shared are acquired, for example, the files to be shared within a predefined time range are acquired, and at least two file packages are formed, specifically, the number of files in each of the file packages is determined in accordance with the network bandwidth, and at least two compressed file packages are respectively formed; the number of files produced within the predefined time range is acquired, and by taking factors such as the network bandwidth into consideration, the files are divided into a plurality of file packages, and each of the file packages is compressed to respectively form compressed file packages; the number of files included in the file package is set in accordance with the size of the file, so the number of the files in the package is variable, for example, as for the statement files between different electronic banks and so on, the number of the files included in each file package is determined by acquiring the network bandwidth, and further, the file packages are compressed to form a plurality of compressed file packages, the compressing method may use compression tools, for example, gzip, winRAR, and so on, and the disclosure does not limit the specific method used for compression.

Further, the file packages are compressed and enciphered respectively to form the compressed file packages. The step of forming at least two compressed file packages further comprises executing compressing and enciphering operations, which improves the security of the files by enciphering, and in particular improves the security of the files with high security requirements such as statements between electronic banks. As for the enciphering method, compression software may be used for enciphering, or an operating system or enciphering software may be used for enciphering, and the disclosure does not limit the specific methods for compression and enciphering.

Furthermore, the respective compressed file packages are uploaded on the blockchain concurrently, and since there is no dependent transaction relationship between the respective compressed file packages, the compressed file packages are uploaded concurrently; that is, the compressed file packages are uploaded on the blockchain concurrently. It may be understood that due to the existence of limitations of resources such as the network bandwidth, a plurality of compressed file packages may be uploaded in batches, the compressed file packages in each batch are uploaded concurrently, and by the simultaneous uploading operations, the file uploading efficiency is improved; further, the at least two compressed file packages are uploaded on the blockchain, and at least two first hash values respectively corresponding to the at least two compressed file packages are acquired from the blockchain; wherein the compressed file packages may be used as transactions to be uploaded on the blockchain, and the hash values returned with respect to the transactions are acquired from the blockchain, the hash values being just the first hash values of the compressed file packages, that is, the first hash values corresponding to the compressed file packages, that is, the first hash values corresponding to the compressed file packages are acquired from the blockchain; further, the blockchain used may be an alliance chain, a private chain, and so on, and the disclosure does not limit the type of the blockchain. The disclosure does not limit the specific tool or method used for executing a blockchain uploading operation.

Step S102: using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value.

Specifically, in accordance with the first hash values corresponding to the respective compressed file packages formed in step S101, an intermediate hash value is generated based on the selected one pair of current hash values, and the intermediate hash value is uploaded on the blockchain; specifically, as for generating an intermediate hash value based on the selected one pair of current hash values, two (one pair) current hash values may be combined to generate an intermediate hash value, or the two (one pair) current hash values may be calculated to generate an intermediate hash value, and the disclosure does not limit the specific method for generating an intermediate hash value based on a pair of current hash values. That is, an intermediate hash value is generated based on the selected one pair of current hash values, and the intermediate hash value is uploaded on the blockchain; a corresponding second hash value is acquired from the blockchain, wherein the intermediate hash value may be used as a transaction to be uploaded, and the hash value returned with respect to the transaction is acquired from the blockchain, the hash value being just the second hash value; by making executions in a loop, similar operations are executed on the second hash values (i.e., current hash values) on the respective levels until a root hash value is acquired.

In the process of making executions in a loop, the first hash value and the second hash value are used as the current hash values; it may be understood that according to the aforesaid descriptions, the hash values on the respective levels are acquired by making executions in a loop until a unique root hash value is acquired (i.e., until the number of the current hash values is 1), and the first hash value and the second hash values on the respective levels form a hash value storage structure of a binary tree. By the aforesaid method, the file acquiring complexity is increased, so the security of the files is improved.

Figure 3:
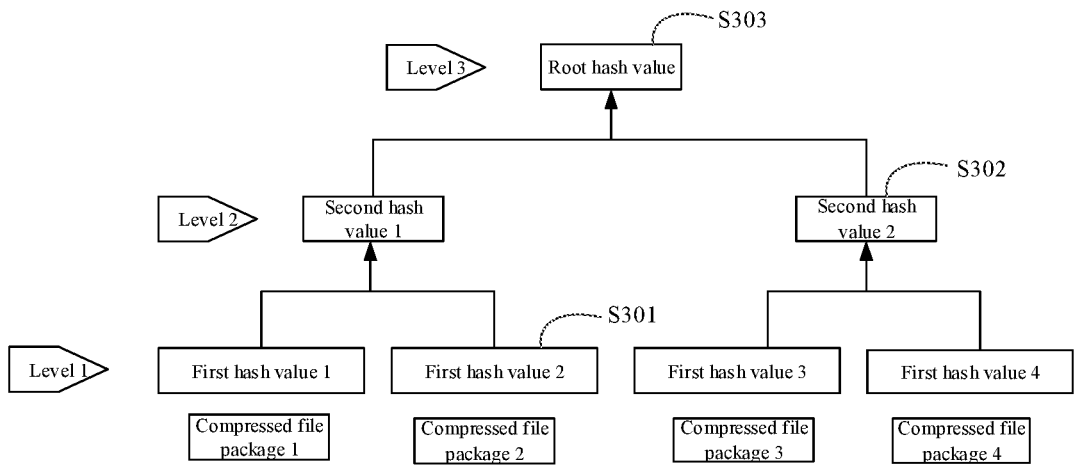
FIG. 3 is a schematic diagram of storing shared file hash values using a binary tree structure provided by the first embodiment of the disclosure.
Figure 4:
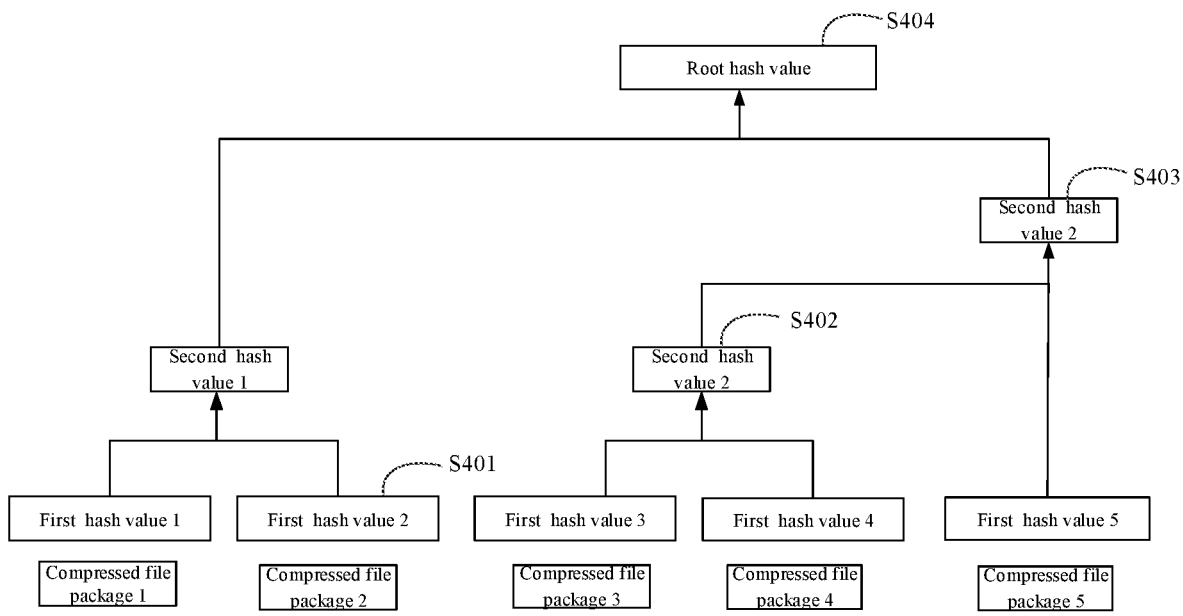
FIG. 4 is a schematic diagram of storing shared file hash values using a binary tree structure provided by the first embodiment of the disclosure.

There are two methods for acquiring the root hash value: the descriptions of the first method are consistent with the descriptions of step S301-step S303 of the example shown in FIG. 3; the descriptions of the second method are consistent with the descriptions of step S401-step S404 of the example shown in FIG. 4, and no unnecessary details are further given herein.

Step S103: using the current hash value as a root hash value, and sending the root hash value.

Specifically, in accordance with the storage structure of the binary tree described in step S102, the root hash value is acquired by making executions in a loop, and the root hash value is sent.

Further, there are two methods for sending the root hash value: 1) sending the root hash value to an acquirer having an authority to acquire the shared files by a blockchain; 2) sending the root hash value to an acquirer having an authority to acquire the shared files in other manners, for example, an official email, and so no. It may be understood that the root hash value is sent to an acquirer having an authority to acquire the shared files, and the acquirer having the authority may be one or more parties; for example, the files are statements produced by bank A and bank B within a predefined time range; the root hash value is produced after step S101-step S103, and then the root hash value is sent to the bank A and the bank B having the authorities to acquire these statement files; obviously, the security of the files is further improved using the operations.

Figure 2:
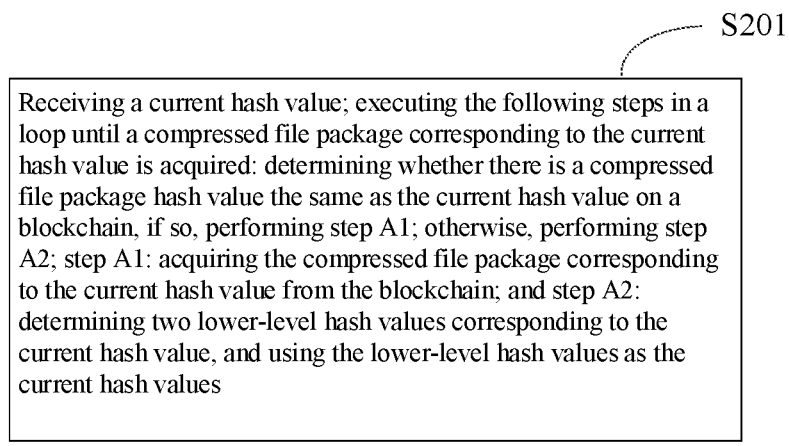
FIG. 2 is a schematic diagram of a flow of acquiring shared files provided by the first embodiment of the disclosure.

As shown in FIG. 2, the first embodiment of the disclosure provides a method for acquiring shared files, and the method may comprise the following steps:

Step S201: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2;

step A1: acquiring the compressed file package corresponding to the current hash value from the blockchain; and step A2: determining two lower-level hash values corresponding to the current hash value, and using the lower-level hash values as the current hash values.

Specifically, the descriptions of the method for executing in a loop the step of acquiring the files in the compressed file packages corresponding to the respective compressed file package hash values from the blockchain are consistent with the descriptions of the examples of step S501-step S503, and no unnecessary details are further given herein.

As shown in FIG. 3, the first embodiment of the disclosure provides a method for storing shared files and hash values using a binary tree structure, and the method may comprise the following steps:

Step S301: acquiring first hash values corresponding to respective compressed file packages.

The descriptions relating to generating the compressed file packages and acquiring the corresponding first hash values are consistent with the descriptions of step S101, and no unnecessary details are further given herein; as shown in FIG. 3, the compressed file package 1-the compressed file package 4 are uploaded on the blockchain, and the corresponding first hash value 1-first hash value 4 are respectively acquired.

Step S302: selecting the current hash values in pairs, uploading the selected one pair of current hash values on the blockchain, acquiring a corresponding second hash value from the blockchain, and using the second hash value as the current hash value; using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value.

Specifically, step S302 describes a process of acquiring the second hash values on the respective levels (and using the second hash values as the current hash values) by making executions in a loop as shown in FIG. 3, and in the example, 3 levels are used to describe the hash values on different levels, and are respectively level 1, level 2, and level 3. Before executions are made in a loop, the at least two first hash values are first used as the current hash values, an intermediate hash value is then generated based on the selected one pair of current hash values, the intermediate hash value is uploaded on the blockchain, and a corresponding second hash value is acquired from the blockchain; as shown in FIG. 3, an intermediate hash value is generated based on the first hash value 1 (current hash value) of the compressed file package 1 and the first hash value 2 (current hash value) of the compressed file package 2, the intermediate hash value is uploaded on the blockchain, and a corresponding second hash value (e.g., second hash value 1) is acquired from the blockchain; an intermediate hash value is generated based on the first hash value 3 of the compressed file package 3 and the first hash value 4 of the compressed file package 4, the intermediate hash value is uploaded on the blockchain, a the corresponding second hash value (e.g., second hash value 2) is acquired from the blockchain; and the second hash values are respectively used as the current hash values; wherein the intermediate hash value may be used as a transaction to be uploaded, and the hash value returned with respect to the transaction is obtained to serve as the second hash value. That is, an intermediate hash value is generated based on the selected one pair of current hash values, the intermediate hash value is uploaded on the blockchain, and a corresponding second hash value is acquired from the blockchain; and the second hash value is used as the current hash value.

Further, it is judged whether the number of the current hash values is 1, and it may be seen from the aforesaid example that the number of the current hash values (second hash values) is not 1, and then step S302 is performed; an intermediate hash value is generated based on the second hash value 1 (current hash value) and the second hash value 2 (current hash value) on the level 2; the intermediate hash value is uploaded on the blockchain, and a corresponding second hash value is acquired from the blockchain, that is, a second hash value (current hash value) on the level 3 is acquired. It is judged again whether the number of the current hash values is 1, and it may be seen that the number of the current hash values is 1, and then the current hash value is used as a root hash value.

It may be understood that the number of the current hash values on each level based on the binary tree structure may be odd or even; in case the number of the current hash values is even, the current hash values are selected in pairs from the at least two current hash values, an intermediate hash value is generated based on the selected one pair of current hash values, the intermediate hash value is uploaded on the blockchain, and a corresponding second hash value is acquired from the blockchain; and in case where the respective current hash values have been selected, the second hash value is used as the current hash value.

Specifically, in the example as shown in FIG. 3, the number of the current hash values (first hash values) on the level 1 is even (4), for example, an intermediate hash value is generated based on the first hash value 1 and the first hash value 2, the intermediate hash value is uploaded on the blockchain, and the second hash value 1 is acquired; an intermediate hash value is generated based on the first hash value 3 and the first hash value 4, the intermediate hash value is uploaded on the blockchain, and the second hash value 2 is acquired; wherein the first hash value 1 and the first hash value 2 are selected in pairs; the first hash value 3 and the second hash value 4 are also selected in pairs; wherein the first hash value 1, the first hash value 2, the first hash value 3 and the first hash value 4 are used as the current hash values; as may be seen, in case where the respective current hash values (first hash value 1, first hash value 2, first hash value 3 and first hash value 4) have been selected, the second hash values (second hash value 1 and second hash value 2) are used as the current hash values; the number of the second hash values on the level 2 acquired based on the current hash values is even (2), that is, the current hash values are selected in pairs, an intermediate hash value is generated based on the selected one pair of current hash values, the intermediate hash value is uploaded on the blockchain, and a corresponding second hash value is acquired from the blockchain; and in case where the respective current hash values have been selected, the second hash value is used as the current hash value.

The descriptions in case the number of the current hash values is odd other than 1 are consistent with the descriptions of step S401-step S404, and no unnecessary details are further given herein.

Step S303: acquiring a root hash value, and sending the root hash value.

Specifically, in case the number of the current hash values is 1, the current hash value is used as a root hash value, and the root hash value is sent. The specific descriptions of sending the root hash value are consistent with the descriptions of step S103, and no unnecessary details are further given herein. It may be understood that levels of a binary tree are determined by the number of the compressed file package hash values; the number of the compressed file package hash values is related to the number of the produced files relating to the service, and the disclosure does not limit the number of the compressed file package hash values.

As shown in FIG. 4, the first embodiment of the disclosure provides a method for storing shared files and hash values using a binary tree structure, and the method may comprise the following steps:

Step S401: acquiring first hash values corresponding to respective compressed file packages.

The descriptions relating to generating the compressed file packages and acquiring the corresponding first hash values are consistent with the descriptions of step S101, and no unnecessary details are further given herein; as shown in FIG. 4, each of the compressed file package 1 to the compressed file package 5 is uploaded on the blockchain, and the corresponding first hash value 1 to first hash value 5 are acquired.

Step S402: selecting the first hash values in pairs, generating an intermediate hash value based on the selected one pair of current hash values, uploading the intermediate hash value on the blockchain, and acquiring a corresponding second hash value from the blockchain; using the second hash value as the current hash value.

Step S403: judging that the number of the current hash values is not 1, and then performing step S402.

Specifically, step S402-step S403 describe a process of acquiring the second hash values (current hash values) on the respective levels by making executions in a loop as shown in FIG. 4; before executions are made in a loop, the at least two first hash values are first used as the current hash values, the current hash values (first hash values) are then selected in pairs, an intermediate hash value is generated based on the selected one pair of current hash values, the intermediate hash value is uploaded on the blockchain, and a corresponding second hash value is acquired from the blockchain; further, the number of the current hash values on each level based on the binary tree structure may be odd or even; in case the number of the current hash values is odd other than 1, the current hash values are selected in pairs from the at least two current hash values, an intermediate hash value is generated based on the selected one pair of current hash values, the intermediate hash value is uploaded on the blockchain, and a corresponding second hash value is acquired from the blockchain; and in case where the number of the current hash values that have not been selected is 1, the second hash value and the one hash value that has not been selected are used as the current hash values.

As shown in FIG. 4, the selected one pair of current hash values are uploaded on the blockchain, and a corresponding second hash value is selected from the blockchain, for example, an intermediate hash value is generated based on the first hash value 1 (current hash value) of the compressed file package 1 and the first hash value 2 (current hash value) of the compressed file package 2, the intermediate hash value is uploaded on the blockchain, and a corresponding second hash value is acquired, that is, the second hash value 1 is acquired; for another example, an intermediate hash value is generated based on the first hash value 3 (current hash value) of the compressed file package 3 and the first hash value 4 (current hash value) of the compressed file package 4, the intermediate hash value is uploaded on the blockchain, and a corresponding second hash value is acquired from the blockchain, for example, the second hash value 2 is acquired; the first hash value 5 (current hash value) is the current hash value that has not been selected; and in case where the number of the current hash values that have not been selected is 1, the second hash values and the one current hash value that has not been selected are used as the current hash values, that is, the second hash value 1, the second hash value 2 and the first hash value 5 are used as the current hash values.

Further, it is judged whether the number of the current hash values is 1, and it may be seen from the aforesaid example that the number of the current hash values (second hash values) is not 1 (but 3), and then step S402 is performed; further, an intermediate hash value is generated based on the selected one pair of current hash values, the intermediate hash value is uploaded on the blockchain, and a corresponding second hash value is acquired from the blockchain, for example, an intermediate hash value is generated based on the second hash value 1 (current hash value) and the first hash value 5 (current hash value), the intermediate hash value is uploaded on the blockchain, and a corresponding second hash value is acquired from the blockchain, for example, the second hash value 2 (current hash value) is acquired; further, it may be seen from FIG. 4 that the second hash value 1 (current hash value) is the current hash value that has not been selected; and in case where the number of the current hash values that have not been selected is 1, the second hash value (second hash value 2) and the one current hash value (second hash value 1) that has not been selected are used as the current hash values; in a loop, it is judged again whether the number of the current hash values is 1, and it may be seen that the number of the current hash values is 1, and then the current hash value 1 is used as the root hash value.

That is, the at least two first hash values are used as current hash values, and the following operations are executed in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value.

Step S404: sending the root hash value.

Specifically, in case the number of the current hash values is 1, the current hash value is used as the root hash value, and the root hash value is sent. The specific descriptions of sending the root hash value are consistent with the descriptions of step S103, and no unnecessary details are further given herein. It may be understood that levels of a binary tree are determined by the number of the compressed file package hash values; the number of the compressed file package hash values is related to the number of the produced files relating to the service, and the disclosure does not limit the number of the compressed file package hash values.

Figure 5:
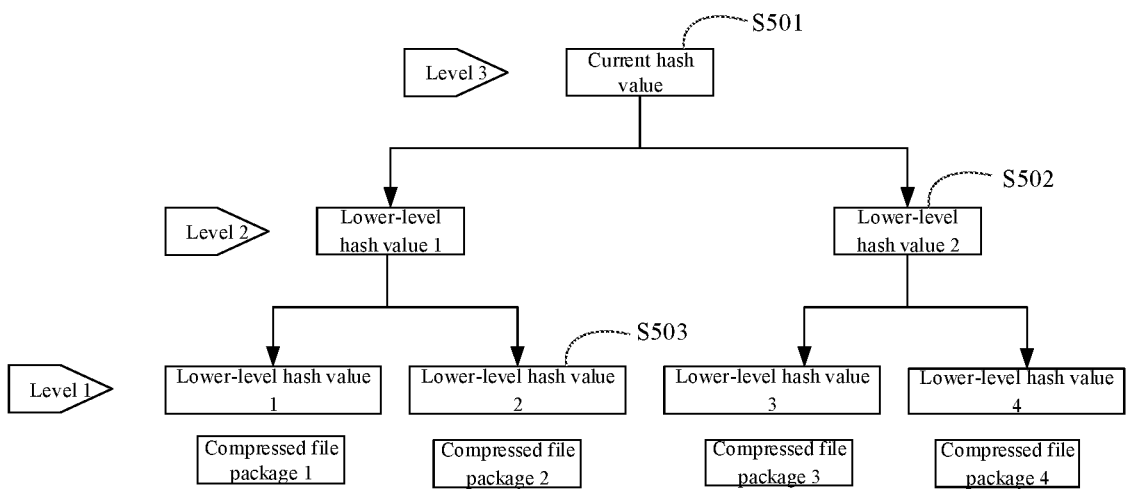
FIG. 5 is a schematic diagram of a flow of acquiring shared files provided by the first embodiment of the disclosure.

As shown in FIG. 5, the first embodiment of the disclosure provides a method for acquiring shared files based on hash values of a binary tree structure, and the method may comprise the following steps:

Step S501: receiving a current hash value.

Specifically, the current hash value is just the root hash value.

Step S502-step S503: acquiring a compressed file package.

Specifically, the following steps are executed in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining two lower-level hash values corresponding to the current hash value, and using the lower-level hash values as the current hash values.

In the example as shown in FIG. 5, the current hash value (root hash value) is acquired, it is determined whether there is a compressed file package hash value the same as the current hash value (root hash value) on the blockchain, and it may be seen that there is no compressed file package hash value the same as the current hash value (root hash value), and then step A2 is performed, i.e., determining two lower-level hash values corresponding to the current hash value, and using the lower-level hash values as the current hash values, that is, determining the two lower-level hash values corresponding to the current hash value (root hash value), which are respectively the lower-level hash value 1 and the lower-level hash value 2; and using the lower-level hash values (lower-level hash value 1 and lower-level hash value 2) as the current hash values.

It is judged and determined in a loop whether there are compressed file package hash values the same as the current hash values (lower-level hash value 1 and lower-level hash value 2) on the blockchain; as shown in FIG. 5, for the lower-level hash value 1 and the lower-level hash value 2, there are no compressed file package hash values the same as the current hash values (lower-level hash value 1 and lower-level hash value 2), and then step A2 is performed, i.e., determining two lower-level hash values corresponding to the current hash value, and using the lower-level hash values as the current hash values; it is determined that the two lower-level hash values corresponding to the current hash value (level 2: lower-level hash value 1) are respectively the lower-level hash value 1 and the lower-level hash value 2; it is judged and determined in a loop whether there are compressed file package hash values the same as the current hash values (level 1: lower-level hash value 1 and lower-level hash value 2) on the blockchain, and then step A1 is performed, i.e., acquiring the compressed file package corresponding to the current hash value from the blockchain; that is, respectively acquiring the compressed file package 1 corresponding to the lower-level hash value 1 (level 1); and so on to acquire one or each compressed file package.

Furthermore, each of the acquired compressed file packages is decompressed and deciphered, and the decompressing and deciphering methods correspond to the compressing and enciphering methods; that is, the step of acquiring the compressed file package corresponding to the current hash value comprises: acquiring the compressed file package corresponding to the current hash value, and decompressing and deciphering the compressed file package to acquire files in the compressed file package.

It may be understood that levels of a binary tree are determined by the number of the compressed file package hash values; and the number of the compressed file package hash values is related to the number of the produced files relating to the service, and the disclosure does not limit the number of the compressed file package hash values.

Figure 6:
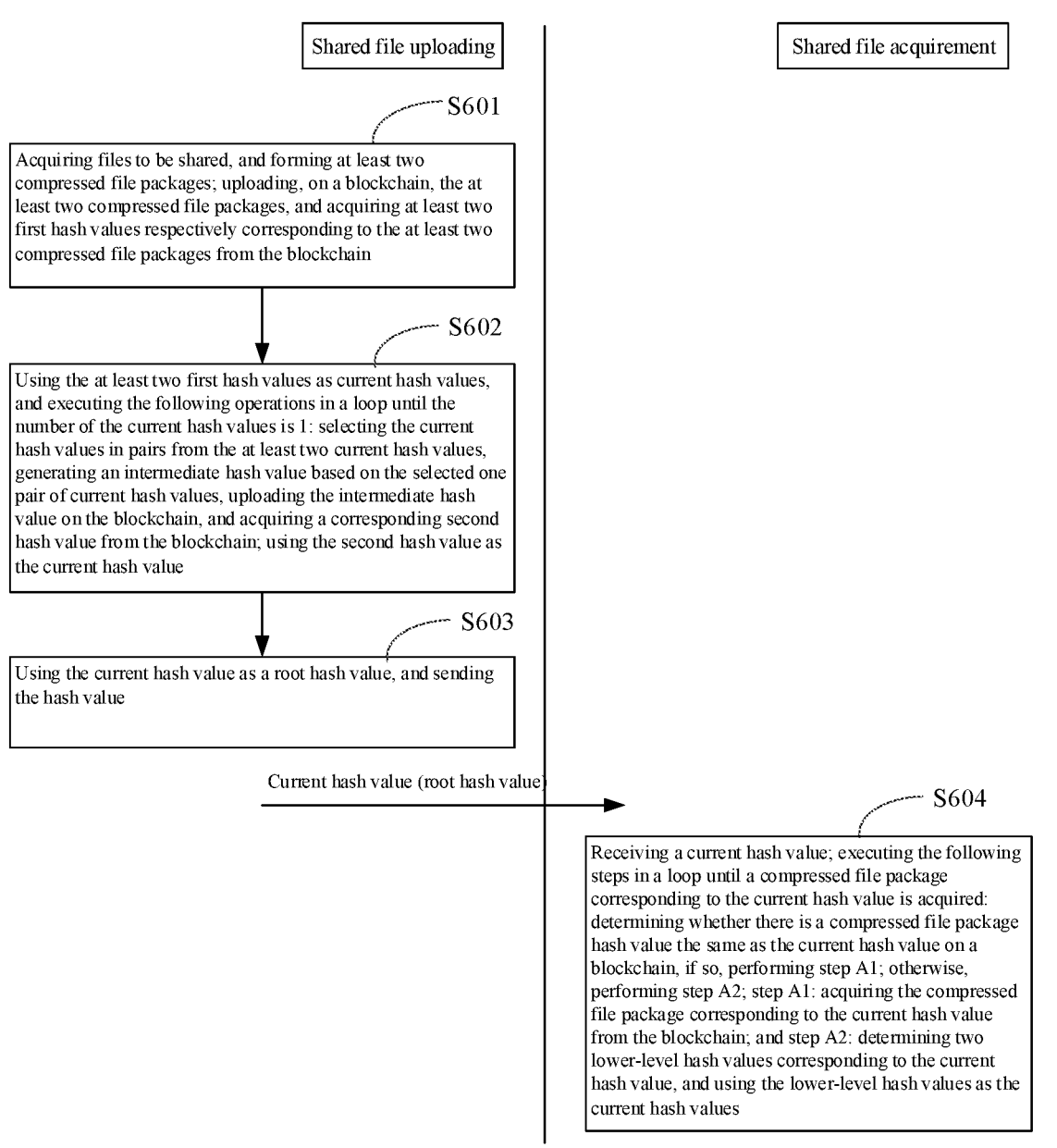
FIG. 6 is a schematic diagram of a flow of sharing files provided by the first embodiment of the disclosure.

As shown in FIG. 6, the first embodiment of the disclosure provides a flow of sharing files, and the flow may comprise the following steps:

In the schematic flowchart as shown in FIG. 6, step S601-step S603 are used to describe a process of uploading shared files; step S604 is used to describe a process of acquiring shared files by a shared file acquirer; for example, bank headquarters may upload the shared files, and the shared file acquirer may be an enterprise directly related to the shared files in terms of the service, for example, bank 1, bank 2, bank 3, and so on.

Step S601: acquiring files to be shared, and forming at least two compressed file packages; uploading, on a blockchain, the at least two compressed file packages, and acquiring at least two first hash values respectively corresponding to the at least two compressed file packages from the blockchain.

Specifically, the descriptions relating to forming and uploading the compressed file packages are consistent with the descriptions of step S101, and no unnecessary details are further given herein; further, the step of acquiring files to be shared, and forming at least two compressed file packages comprises: acquiring files to be shared within a predefined time range, forming at least two file packages, and determining the number of files in the file packages in accordance with a network bandwidth. The file packages are compressed and enciphered respectively to form the compressed file packages. The compressed file packages are uploaded on the blockchain concurrently.

Step S602: using the at least two first hash values as current hash values, and executing the following operations in a loop until the number of the current hash values is 1: selecting the current hash values in pairs from the at least two current hash values, generating an intermediate hash value based on the selected one pair of current hash values, the intermediate hash value is uploaded on the blockchain, and acquiring a corresponding second hash value from the blockchain; using the second hash value as the current hash value.

Specifically, the descriptions relating to acquiring the root hash value by making executions in a loop are consistent with the descriptions of step S102, and no unnecessary details are further given herein.

Step S603: using the current hash value as a root hash value, and sending the root hash value.

Specifically, the descriptions relating to sending the root hash value are consistent with the descriptions of step S103, and no unnecessary details are further given herein.

Step S604: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2;
 step A1: acquiring the compressed file package corresponding to the current hash value from the blockchain; and step A2: determining two lower-level hash values corresponding to the current hash value, and using the lower-level hash values as the current hash values.

Specifically, the descriptions relating to acquiring two lower-level hash values corresponding to the root hash value in accordance with the root hash value are consistent with the descriptions of step S201, and no unnecessary details are further given herein; further, the step of acquiring the compressed file package corresponding to the current hash value comprises: acquiring the compressed file package corresponding to the current hash value, and decompressing and deciphering the compressed file package to acquire files in the compressed file package.

Figure 7:
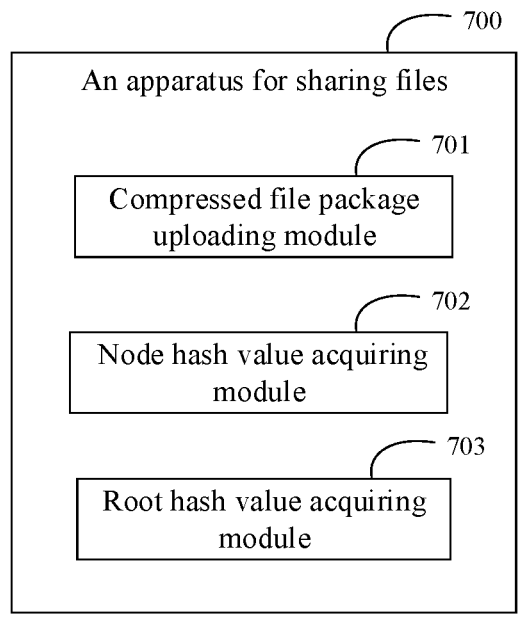
FIG. 7 is a schematic diagram of a structure of an apparatus for sharing files provided by the first embodiment of the disclosure.

As shown in FIG. 7, the first embodiment of the disclosure provides an apparatus for sharing files 700, the apparatus for sharing files 700 comprising: a compressed file package uploading module 701, a node hash value acquiring module 702 and a root hash value acquiring module 703; wherein,
 the compressed file package uploading module 701 is used for acquiring files to be shared, and forming at least two compressed file packages; uploading, on a blockchain, the at least two compressed file packages, and acquiring at least two first hash values respectively corresponding to the at least two compressed file packages from the blockchain;
 the node hash value acquiring module 702 is used for using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and
 the root hash value acquiring module 703 is used for using the current hash value as a root hash value, and sending the root hash value.

Optionally, the node hash value acquiring module 702 further comprises in case the number of the current hash values is even, selecting the current hash values in pairs from the at least two current hash values, generating an intermediate hash value based on the selected one pair of current hash values, uploading the intermediate hash value on the blockchain, and acquiring a corresponding second hash value from the blockchain; and in case where the respective current hash values have been selected, using the second hash value as the current hash value.

Optionally, the node hash value acquiring module 702 further comprises in case the number of the current hash values is odd other than 1, selecting the current hash values in pairs from the at least two current hash values, generating an intermediate hash value based on the selected one pair of current hash values, uploading the intermediate hash value on the blockchain, and acquiring a corresponding second hash value from the blockchain; and in case where the number of the current hash values that have not been selected is 1, using the second hash value and the one hash value that has not been selected as the current hash values.

Optionally, the compressed file package uploading module 701 is further used for acquiring files to be shared, and forming at least two compressed file packages, which comprises: acquiring files to be shared within a predefined time range, forming at least two file packages, and determining the number of files in the file packages in accordance with a network bandwidth.

Optionally, the compressed file package uploading module 701 is further used for compressing and enciphering the file packages respectively to form the compressed file packages.

Optionally, the compressed file package uploading module 701 is further used for uploading the compressed file packages on the blockchain concurrently.

Figure 8:
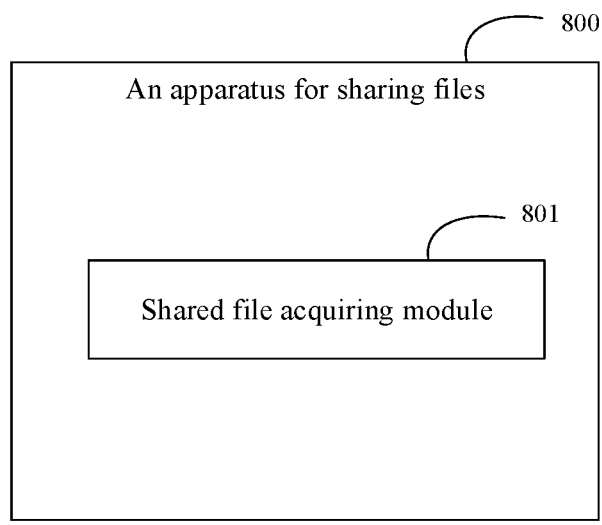
FIG. 8 is a schematic diagram of a structure of an apparatus for acquiring shared files provided by the first embodiment of the disclosure.

As shown in FIG. 8, the first embodiment of the disclosure provides an apparatus for sharing files 800, comprising: a shared file acquiring module 801; wherein, the shared file acquiring module 801 is used for receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining two lower-level hash values corresponding to the current hash value, and using the lower-level hash values as the current hash values.

Optionally, the shared file acquiring module 801 is further used for acquiring the compressed file package corresponding to the current hash value, which comprises: acquiring the compressed file package corresponding to the current hash value, and decompressing and deciphering the compressed file package to acquire files in the compressed file package.

The first embodiment of the disclosure further provides a file sharing electronic device, comprising: one or more processors; and a storage means for storing one or more programs, the one or more programs, when executed by the one or more processors, causing the one or more processors to implement a method provided by any of the aforesaid embodiments.

The first embodiment of the disclosure further provides a computer-readable medium, on which medium a computer program is stored, the program, when executed by a processor, implementing a method provided by any of the aforesaid embodiments.

Figure 9:
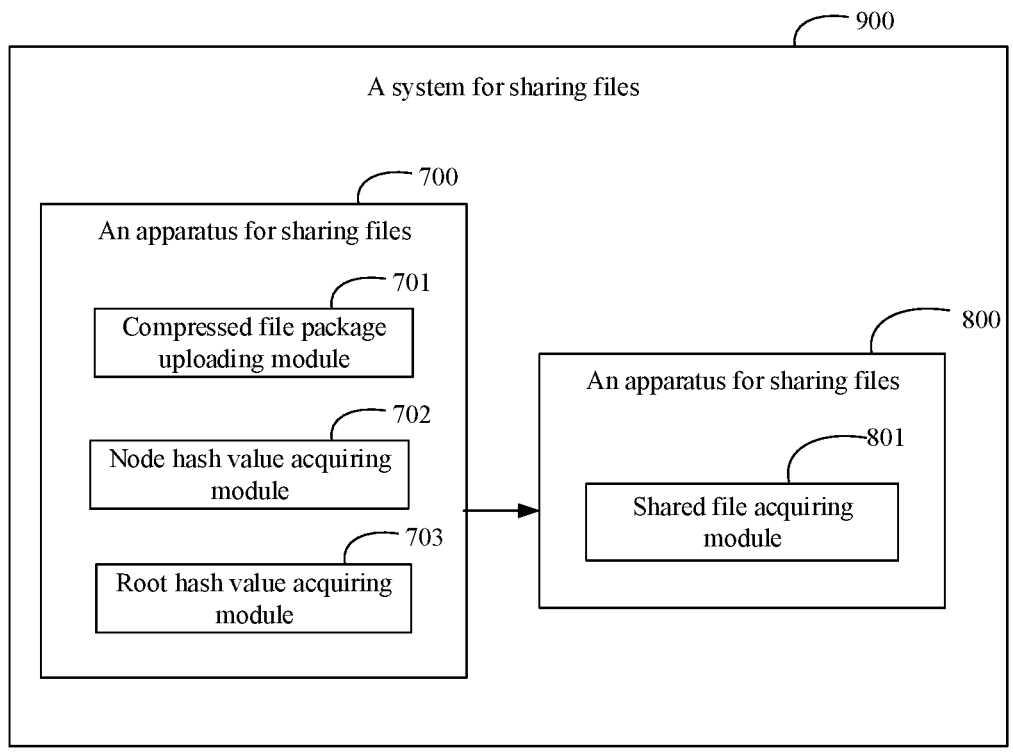
FIG. 9 is a schematic diagram of a structure of a system for acquiring shared files provided by the first embodiment of the disclosure.

As shown in FIG. 9, the first embodiment of the disclosure provides a system for sharing files 900, comprising: an apparatus for sharing files 700 provided by the first embodiment of the disclosure and an apparatus for sharing files 800 provided by the first embodiment of the disclosure.

Figure 10:
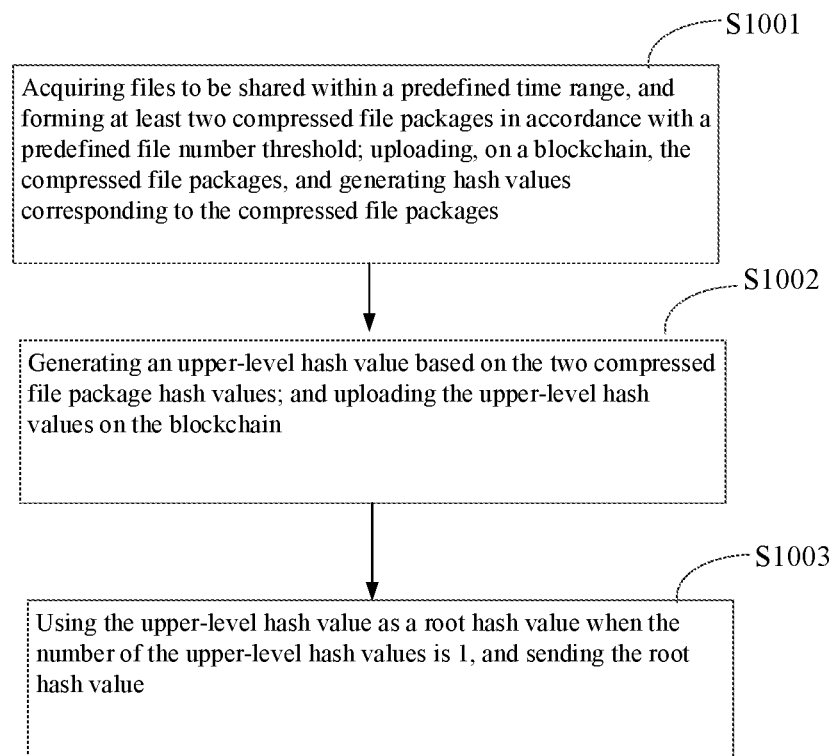
FIG. 10 is a schematic diagram of a flow of a method for storing shared files provided by the second embodiment of the disclosure.

As shown in FIG. 10, the second embodiment of the disclosure provides a method for storing shared files, and the method may comprise the following steps:

Step S1001: acquiring files to be shared, and forming a plurality of compressed file packages; uploading, on a blockchain, the compressed file packages, and acquiring at least three first hash values corresponding to the compressed file packages from the blockchain.

Specifically, the files to be shared may be transaction files produced by an electronic bank, statement files produced by an electronic bank, order files generated by an electronic mall, and so on; the disclosure does not limit the format and content of the files to be shared; further, the step of acquiring files to be shared, and forming a plurality of compressed file packages comprises: acquiring files to be shared within a predefined time range, forming at least three file packages, and determining the number of files in the file packages in accordance with a network bandwidth.

Specifically, the embodiment of the disclosure forms a multi-way tree shaped hash value structure by uploading the hash values on the respective levels and acquiring the hash values on the next level by making executions in a loop based on the hash values corresponding to the plurality of compressed file packages, and the number of ways of the multi-way tree is at least 3, that is, the set number is an integer greater than 2; that is, at least three first hash values corresponding to the compressed file packages are acquired from the blockchain; it may be understood that the number of the compressed file packages may be the number of the shared files received within a time range, that is, the files to be shared produced within a predefined time range are acquired, for example, transaction files produced by an electronic bank within one hour, statement files produced by two electronic banks within one hour, order files produced by an electronic mall within one day, and so on, and the predefined time range may be set in accordance with the service scenario and the number of the produced files, for example, one day one hour, one minute, and so on; the disclosure does not limit the specific content of the predefined time range.

Further, the files to be shared are acquired, for example, the files to be shared within a predefined time range are acquired, at least three file packages are formed, the number of files in each of the file packages may be determined in accordance with the network bandwidth, and at least three compressed file packages are respectively formed; the number of files produced within the predefined time range is acquired, by taking factors such as the network bandwidth into consideration, the files are divided into a plurality of file packages, and each of the file packages is compressed to respectively form compressed file packages; the number of files included in the file package is set in accordance with the size of the file, so the number of the files in the package is variable, the number of the files included in each file package is determined by acquiring the network bandwidth in accordance with a total number within a time range, and further, the file packages are compressed to form a plurality of compressed file packages.

The file packages are compressed and enciphered to form the compressed file packages. The step of forming at least three compressed file packages further comprises executing compressing and enciphering operations, which improves the security of the files by enciphering, and in particular improves the security of the files with high security requirements such as statements between electronic banks. As for the enciphering method, compression software may be used for enciphering, for example, gzip, winRAR, and so on; as for the enciphering method, compression software may be used for enciphering, or an operating system or enciphering software may be used for enciphering, and the disclosure does not limit the specific method for compression and the specific method for enciphering.

Furthermore, the respective compressed file packages are uploaded on the blockchain concurrently, and since there is no dependent transaction relationship between the respective compressed file packages, the compressed file packages are uploaded concurrently; that is, the compressed file packages are uploaded on the blockchain concurrently. It may be understood that due to the existence of limitations of resources such as the network bandwidth, a plurality of compressed file packages may be uploaded in batches, the compressed file packages in each batch are uploaded concurrently, and by the simultaneous uploading operations, the file uploading efficiency is improved; further, the at least three compressed file packages are uploaded on the blockchain, and at least three first hash values respectively corresponding to the at least three compressed file packages are acquired; wherein the compressed file packages may be respectively used as transactions to be uploaded on the blockchain, and the hash values returned with respect to the transactions are respectively acquired from the blockchain, the hash values being just the first hash values of the compressed file packages; wherein the blockchain used may be an alliance chain, a private chain, and so on, and the disclosure does not limit the type of the blockchain. The disclosure does not limit the specific tool or method used for executing a blockchain uploading operation.

Step S1002: using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2.

Specifically, in accordance with the first hash values corresponding to the respective compressed file packages formed in step S1001, an intermediate hash value is generated based on the selected set number of current hash values, the intermediate hash value is uploaded on the blockchain, and a corresponding second hash value is acquired from the blockchain; specifically, as for generating an intermediate hash value based on the selected set number of current hash values, the set number of current hash values may be combined to generate an intermediate hash value, or the set number of current hash values may be calculated to generate an intermediate hash value, and the disclosure does not limit the specific method for generating an intermediate hash value based on a set number of current hash values. Further, the intermediate hash values may be used as transactions to be uploaded on the blockchain, and the second hash values returned with respect to the transactions are respectively acquired from the blockchain; the step is executed in a loop, the second hash values on the respective levels are acquired. The set number is an integer greater than 2, for example, 3, 4, 10, 100 and 1000, the set number is used for setting the number of ways of the multi-way tree structure, the set number may be determined in accordance with the service scenario or the number of the compressed file packages, and the disclosure does not limit the specific value of the set number.

In the process of making executions in a loop, the first hash value and the second hash value are used as the current hash values; it may be understood that according to the aforesaid descriptions, the hash values on the respective levels are acquired by making executions in a loop until a unique root hash value is acquired (that is, until the number of the current hash values is 1), and each of the first hash value and the second hash values (current hash values) is uploaded on the blockchain to form a hash value storage structure of a multi-way tree (a bifurcated tree having a set number of ways). By the aforesaid method, the file acquiring complexity is increased, so the security of the files is improved.

An example is given below for illustrations, for example, the number of the compressed file package hash values is 99, 99 first hash values are correspondingly formed; the set number is 5; then the first hash values are used as the current hash values, the following operations are executed in a loop until the number of the current hash values is 1: that is, the 99 first hash values are used as the current hash values, and the following operations are executed in a loop: respectively selecting the set number (e.g., 5) of current hash values from the 99 hash values, generating an intermediate hash value based on the selected set number (e.g., 5) of current hash values, uploading the intermediate hash value on the blockchain, and acquiring a corresponding second hash value from the blockchain; it may be understood that the 5 current hash values are respectively selected from the 99 first current hash values, an intermediate hash value is generated in accordance with the selected 5 hash values, the intermediate hash value is uploaded on the blockchain, and a corresponding second hash value is acquired from the blockchain, it may be seen by the aforesaid operations that 19 second hash values are acquired; further, the 19 second hash values are acquired based on 95 (19*5) first hash values among the 99 first hash values; it may be understood that since the set number is 5, 4 first hash values have not been selected, in case the number of the current hash values that have not been selected is less than the set number (e.g., 5), an intermediate hash value is generated based on the 4 first hash values, the intermediate hash value is uploaded on the blockchain, and a corresponding second hash value is acquired from the blockchain; that is, an intermediate hash value is generated based on the current hash values that have not been selected in case there are the current hash values that have not been selected and the number of the current hash values that have not been selected is less than the set number, the intermediate hash value is uploaded on the blockchain, and a corresponding second hash value is acquired from the blockchain.

It may be seen based on the aforesaid example steps that 20 second hash values are acquired from the 99 first hash values, further, the 20 second hash values are used as the current hash values, and the aforesaid steps are executed in a loop; further, it may be similarly seen that 5 (set number) current hash values are respectively selected from the 20 current hash values to generate an intermediate hash value, the intermediate hash value is uploaded on the blockchain, a corresponding next-level second hash value is acquired from the blockchain, and 4 second hash values (current hash values) are acquired; furthermore, 1 second hash value is acquired, that is, until the number of the current hash values is 1; the operations that are executed in a loop are stopped. That is, the first hash values are used as current hash values, and the following operations are executed in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2.

It may be understood that according to the aforesaid descriptions, the operations of acquiring the hash values are executed in a loop until a unique root hash value is acquired, and a hash value storage structure of a multi-way tree is formed. By the aforesaid method, the file acquiring complexity is increased, so the security of the files is improved. The further descriptions of the method for acquiring the root hash value are consistent with the descriptions of step S1201-step S1203 of the example shown in FIG. 22, and no unnecessary details are further given herein.

Step S1003: using the current hash value as a root hash value, and sending the root hash value.

Figure 15:
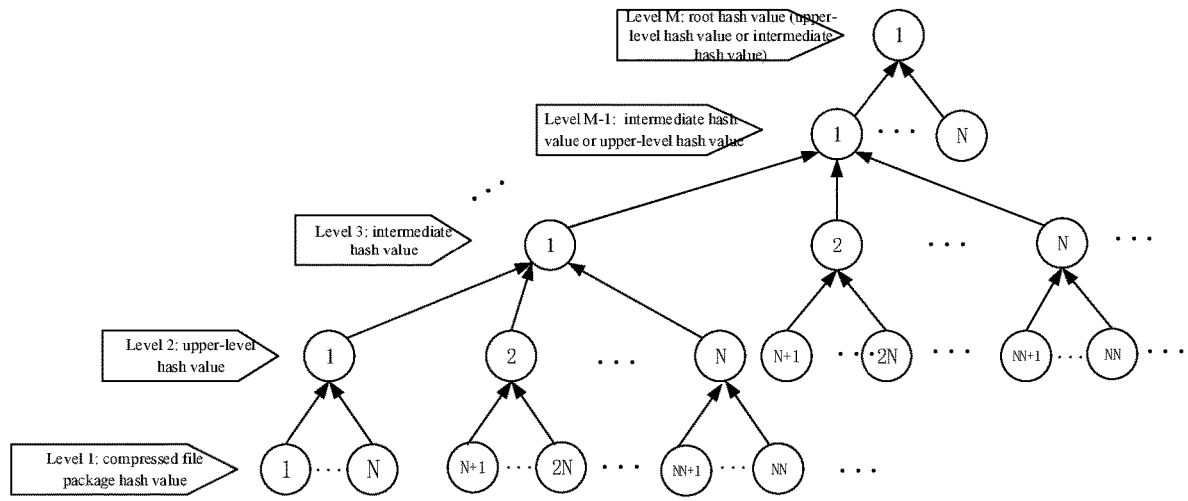
FIG. 15 is a schematic diagram of storing shared file hash values using a multi-way tree structure provided by the second embodiment of the disclosure.

Specifically, in accordance with the storage structure of the multi-way tree (i.e., a bifurcate tree having a set number of ways) described in step S1002, after making executions in a loop, the root hash value is acquired and the root hash value is sent; further, the schematic diagram of FIG. 15 is used below to illustrate the aforesaid step, as shown in FIG. 15, if the set number is N; and the numbers in the respective circles represent the identifications of the current hash values on the respective levels, assuming that before the root hash value is acquired, the numbers of the current hash values on the respective levels are not less than the set number, N current hash values are respectively selected, intermediate hash values are respectively generated in accordance with the selected set number of current hash values, the intermediate hash values is uploaded on the blockchain, and a plurality of corresponding second hash values are acquired from the blockchain; the aforesaid operations are executed in a loop, after M levels, the number of the current hash values is 1, that is, the root hash value is acquired; further, there are two methods for sending the root hash value: 1) sending the root hash value to an acquirer having an authority to acquire the shared files by a blockchain; 2) sending the root hash value to an acquirer having an authority to acquire the shared files in other manners, for example, an official email, and so no; it may be understood that the root hash value is sent to an acquirer having an authority to acquire the shared files, and the acquirer having the authority may be one or more parties; for example, the files are statements produced by bank A and bank B within a predefined time range; the root hash value is produced after step S1001-step S1003, and then the root hash value is sent to the bank A and the bank B having the authorities to acquire these statement files; obviously, the security of the files is further improved using the operations.

Figure 11:
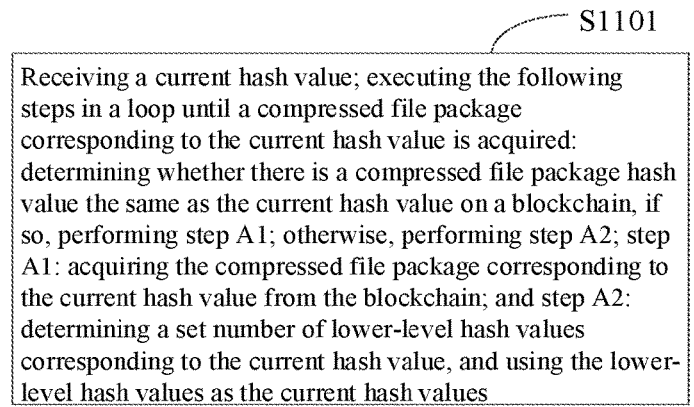
FIG. 11 is a schematic diagram of a flow of acquiring shared files provided by the second embodiment of the disclosure.

As shown in FIG. 11, the second embodiment of the disclosure provides a method for acquiring shared files, and the method may comprise the following steps:

Step S1101: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

Specifically, the descriptions of the method for acquiring the files in the compressed file package corresponding to the compressed file package hash value from the blockchain in accordance with the root hash value are consistent with the descriptions of the examples of step S1301-step S1303, and no unnecessary details are further given herein.

Figure 12:
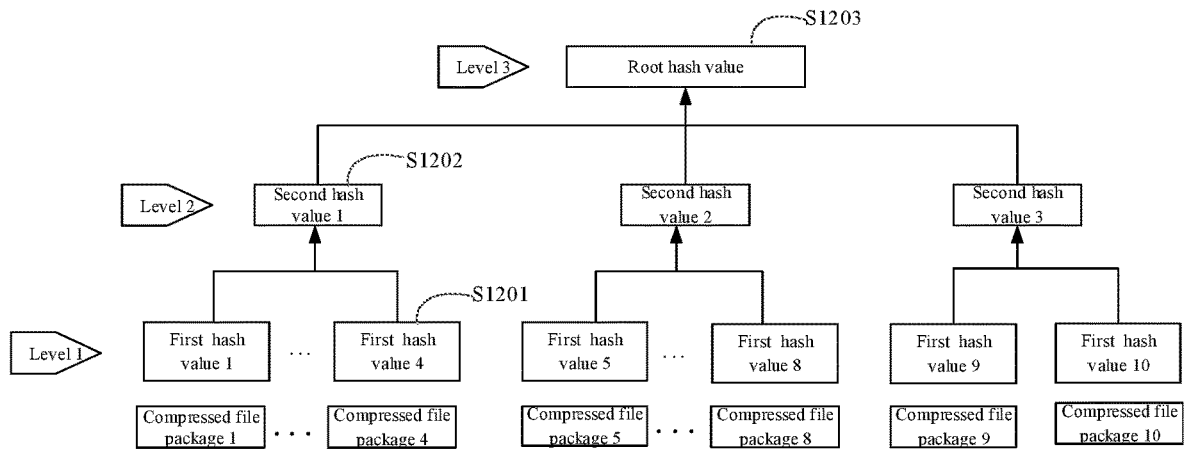
FIG. 12 is a schematic diagram of storing shared file hash values using a multi-way tree structure provided by the second embodiment of the disclosure.

As shown in FIG. 12, the third embodiment of the disclosure provides a method for storing shared files and hash values using a multi-way tree structure, and the method may comprise the following steps:

Step S1201: acquiring first hash values corresponding to respective compressed file packages.

Figure 22:
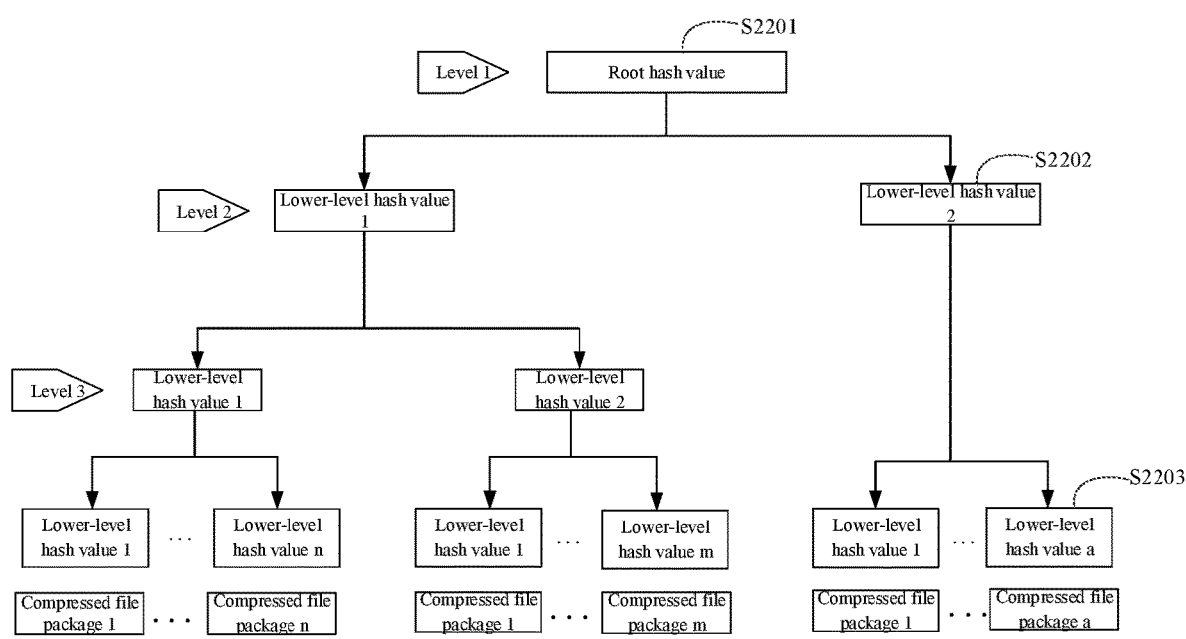
FIG. 22 is a schematic diagram of a flow of acquiring shared files provided by the third embodiment of the disclosure.

Specifically, the descriptions relating to generating the compressed file packages and acquiring the corresponding first hash values are consistent with the descriptions of step S1001, and no unnecessary details are further given herein. In the example as shown in FIG. 22, 10 compressed file packages are included, and it may be understood that the number of the compressed file packages may be tens, hundreds, tens of thousands, hundreds of thousands, millions, tens of millions, and so on; in order to illustrate step S1201-step S1203 in detail, the example uses the set number of 4 as an example, that is, a 4-way tree structure is involved; first hash values 1-10 are respectively acquired in accordance with the compressed file packages 1-10.

Step S1202-step S1203: acquiring second hash values.

Specifically, the examples of step S1202-step S1203 describe the operations of acquiring second hash values (current hash values) that are executed in a loop; specifically, for illustrations, as shown in FIG. 12, 3 example levels are used to describe the second hash values, and are respectively level 1, level 2, and level 3; as shown in FIG. 3, 10 first hash values are included in the example; the set number is 4, then the first hash values are used as the current hash values, and the following operates are executed in a loop until the number of the current hash values is 1: 4 first hash values are respectively selected from the 10 first hash values, an intermediate hash value is generated based on the 4 first hash values, the intermediate hash value is uploaded on the blockchain, and a corresponding second hash value is acquired from the blockchain; for example, the second hash value 1 is acquired based on the first hash values 1-4, and the second hash value 2 is acquired based on the first hash values 5-8; the first hash value 9 and the first hash value 10 (subtracting 2 groups, each group including 4 first hash values, from 10 first hash values, the reminder being 2) are the current hash values that have not been selected, and the number of the current hash values that have not been selected is less than the set number, 2<4, and then a corresponding second hash value 3 is acquired based on the 2 first hash values (first hash value 9, first hash value 10); that is, the first hash values are used as the current hash values, and the following operations are executed in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2.

Step S1203: acquiring a root hash value.

Specifically, it may be seen in accordance with step S1202 that the level 2 includes 3 second hash values, and the second hash values are used as the current hash values; the operation of step S1202 is further executed, and the second hash value on the level 3 is acquired; since the number of the second hash values (current hash values) is 1, the current hash value is used as the root hash value; it may be understood that levels of a multi-way tree having a set number of ways is determined by the number of the compressed file package hash values (first hash values); the number of the compressed file package hash values is related to the number of the produced files relating to the service, and the disclosure does not limit the set number and the number of the compressed file package hash values (first hash values).

Figure 13:
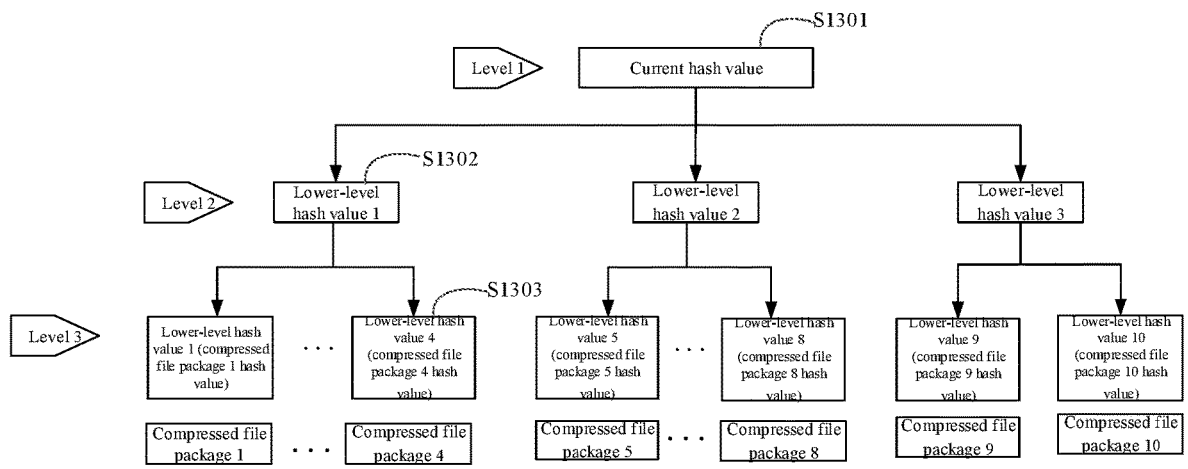
FIG. 13 is a schematic diagram of a flow of acquiring shared files provided by the second embodiment of the disclosure.

As shown in FIG. 13, the second embodiment of the disclosure provides a method for acquiring shared files based on hash values of a multi-way tree structure, and the method may comprise the following steps:

Step S1301-step S1303 below take the examples descried in step S1201-step S1203 as examples to illustrate the method for acquiring shared files based on hash values of a multi-way tree structure.

Step S1301: in accordance with a current hash value (root hash value).

Specifically, a current hash value is received; it is determined whether there is a compressed file package hash value the same as the current hash value on the blockchain; as shown in FIG. 13, it is determined that there is no compressed file package hash value the same as the current hash value on the blockchain, that is, the current hash value is not the compressed file package hash value, and then the set number of lower-level hash values corresponding to the current hash value are determined, and the lower-level hash values are used as the current hash values; the lower-level hash values of the current hash value are respectively the lower-level hash value 1, the lower-level hash value 2, and the lower-level hash value 3; and the lower-level hash values are used as the current hash values.

Step S1302-step S1303: executing the operations of acquiring lower-level hash values in a loop.

The example of the process of traversing hash values on respective levels below the root hash value and acquiring compressed file packages is described below by step S1302-step S1303; specifically, as shown in FIG. 13, the current hash values (lower-level hash value 1, lower-level hash value 2, lower-level hash value 3) are received; it is determined that there are no compressed file package hash values the same as the current hash values (lower-level hash value 1, lower-level hash value 2, lower-level hash value 3) on the blockchain; then respective lower-level hash values corresponding to the current hash values are determined, and the lower-level hash values are used as the current hash values, for example, it is determined that the respective sub-hash values corresponding to the lower-level hash value 1 are the lower-level hash value 1-the lower level hash value 4; it is determined that the respective sub-hash values corresponding to the lower-level hash value 2 are the lower-level hash value 5-the lower level hash value 8; it is determined that the respective sub-hash values corresponding to the lower-level hash value 3 are the lower-level hash value 9 and the lower level hash value 10; further, it is determined there are compressed file package hash values the same as the current hash values (lower-level hash value 1-lower-level hash value 10) on the blockchain; then the compressed file packages corresponding to the current hash values are acquired from the blockchain; the compressed file packages are respectively the compressed file package 1-the compressed file package 10. That is, a current hash value is received; the following steps are executed in a loop until a compressed file package corresponding to the current hash value is acquired: determining whether there is a compressed file package hash value the same as the current hash value on a blockchain, if so, performing step A2; step A1: acquiring the compressed file package corresponding to the current hash value from the blockchain; and step A2: determining respective lower-level hash values corresponding to the current hash value, and using the lower-level hash values as the current hash values.

Further, the step of acquiring the compressed file package corresponding to the current hash value comprises: acquiring the compressed file package corresponding to the current hash value, and decompressing and deciphering the compressed file package to acquire files in the compressed file package; specifically, each of the acquired compressed file packages is decompressed and deciphered, and the decompressing and deciphering methods correspond to the compressing and enciphering methods.

It may be understood that levels of a bifurcated tree having a set number of ways are determined by the number of the compressed file package hash values and the set number; the number of the compressed file package hash values is related to the number of the produced files relating to the service, and the disclosure does not limit the set number and the number of the compressed file package hash values.

Figure 14:
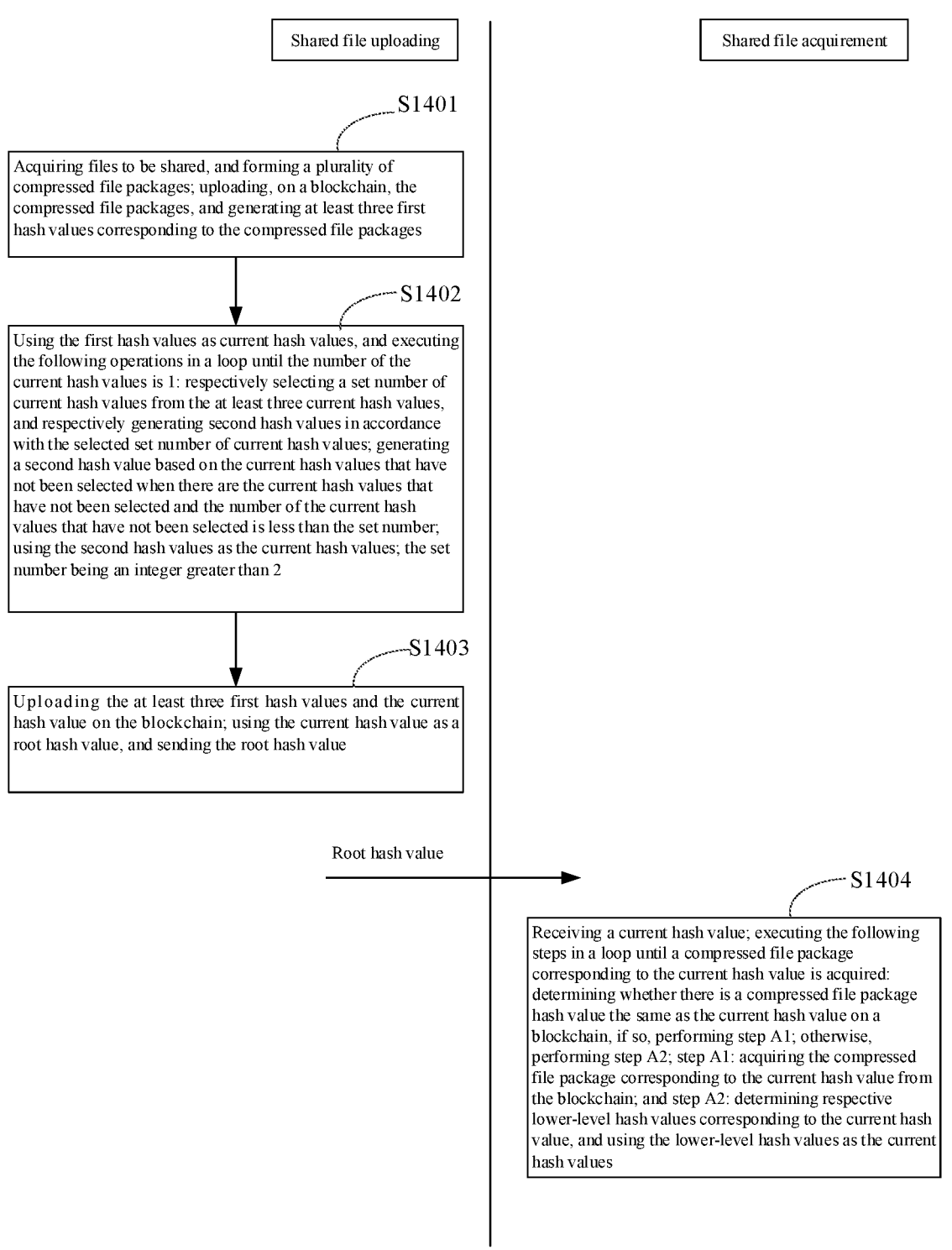
FIG. 14 is a schematic diagram of a flow of sharing files provided by the second embodiment of the disclosure.

As shown in FIG. 14, the second embodiment of the disclosure provides a flow of sharing files, and the flow comprises the following steps:

In the schematic flowchart as shown in FIG. 14, step S1401-step S1403 are used to describe a process of uploading shared files; step S1404-step S1405 are used to describe a process of acquiring shared files by a shared file acquirer; for example, bank headquarters may upload the shared files, and the shared file acquirer may be an enterprise directly related to the shared files in terms of the service, for example, bank 1, bank 2, bank 3, and so on.

Step S1401: acquiring files to be shared, and forming a plurality of compressed file packages.

The descriptions of uploading the compressed file packages on the blockchain, and acquiring at least three first hash values corresponding to the compressed file packages are consistent with the descriptions of step S1001, and no unnecessary details are further given herein. Further, the step of acquiring files to be shared, and forming a plurality of compressed file packages comprises: acquiring files to be shared within a predefined time range, forming at least three file packages, and determining the number of files in the file packages in accordance with a network bandwidth. Further, the file packages are compressed and enciphered respectively to form the compressed file packages. The compressed file packages are uploaded on the blockchain concurrently.

Step S1402: using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2.

Specifically, the descriptions relating to acquiring the root hash value by making executions in a loop are consistent with the descriptions of step S1002, and no unnecessary details are further given herein.

Step S1403: using the current hash value as a root hash value, and sending the root hash value.

Specifically, the descriptions relating to sending the root hash value are consistent with the descriptions of step S1003, and no unnecessary details are further given herein.

Step S1404: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

Specifically, the descriptions relating to acquiring respective lower-level hash values corresponding to the root hash value in accordance with the root hash value are consistent with the descriptions of step S1001, and no unnecessary details are further given herein; further, the step of acquiring the compressed file package corresponding to the current hash value comprises: acquiring the compressed file package corresponding to the current hash value, and decompressing and deciphering the compressed file package to acquire files in the compressed file package.

Figure 16:
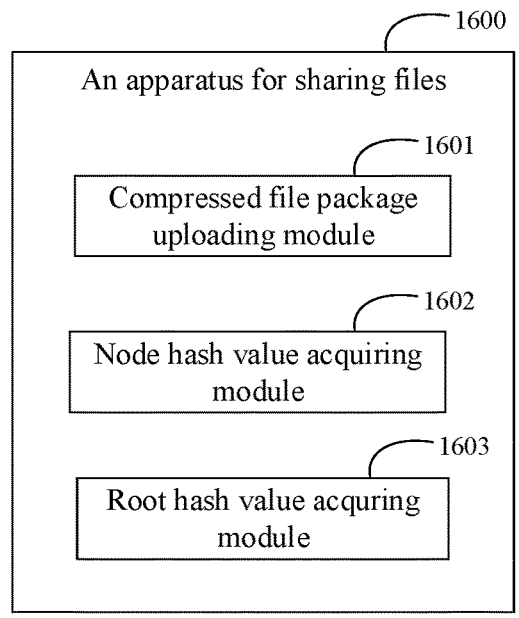
FIG. 16 is a schematic diagram of a structure of an apparatus for sharing files provided by the second embodiment of the disclosure.

As shown in FIG. 16, the second embodiment of the disclosure provides an apparatus for sharing files 1600, comprising: a compressed file package uploading module 1601, a node hash value acquiring module 1602 and a root hash value acquiring module 1603; wherein, the compressed file package uploading module 1601 is used for acquiring files to be shared, and forming a plurality of compressed file packages; uploading, on a blockchain, the compressed file packages, and acquiring at least three first hash values corresponding to the compressed file packages from the blockchain;

the node hash value acquiring module 1602 is used for using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2;

the root hash value acquiring module 1603 is used for using the current hash value as a root hash value, and sending the root hash value.

Figure 17:
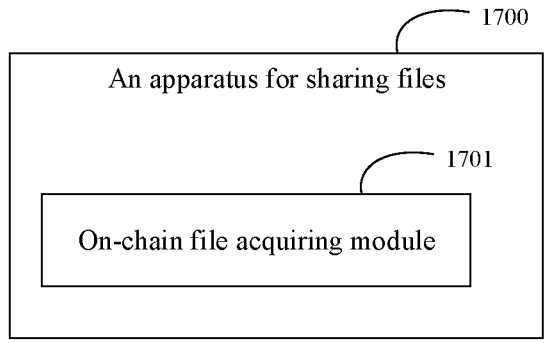
FIG. 17 is a schematic diagram of a structure of an apparatus for acquiring shared files provided by the second embodiment of the disclosure.

As shown in FIG. 17, the second embodiment of the disclosure provides an apparatus for sharing files 1700, comprising: an on-chain file acquiring module 1701; wherein, the on-chain file acquiring module 1701 is used for receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

Figure 18:
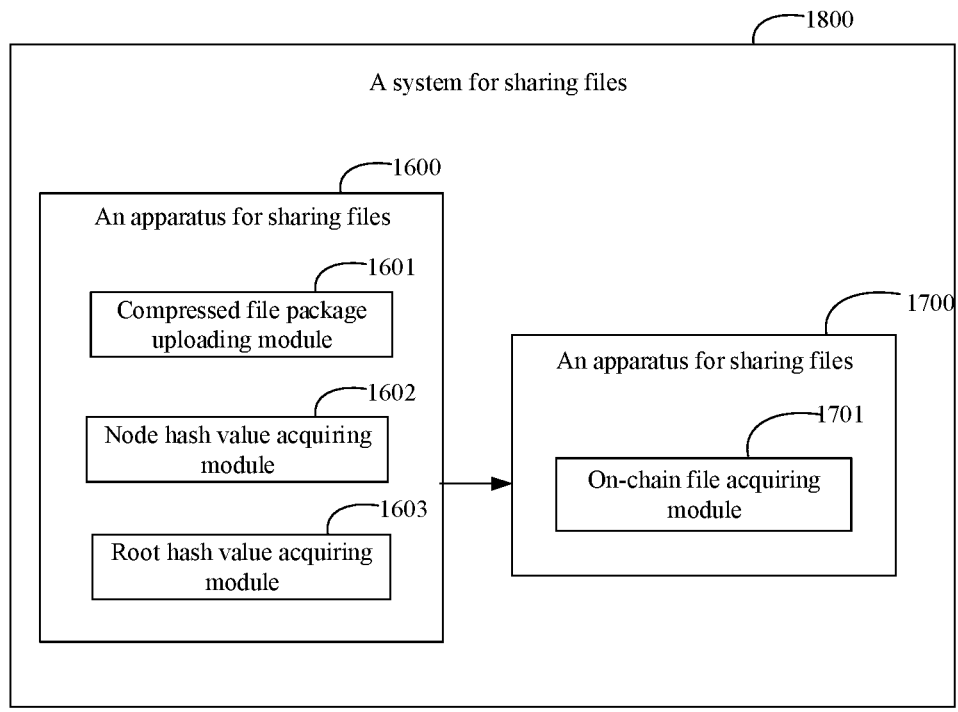
FIG. 18 is a schematic diagram of a structure of a system for acquiring shared files provided by the second embodiment of the disclosure.

As shown in FIG. 18, the second embodiment of the disclosure provides a system for sharing files 1800, comprising: an apparatus for sharing files 1600 provided by the second embodiment of the disclosure and an apparatus for sharing files 1700 provided by the second embodiment of the disclosure.

The second embodiment of the disclosure further provides a file sharing electronic device, comprising: one or more processors; and a storage means for storing one or more programs, the one or more programs, when executed by the one or more processors, causing the one or more processors to implement a method provided by any of the aforesaid embodiments.

The second embodiment of the disclosure further provides a computer-readable medium, on which medium a computer program is stored, the program, when executed by a processor, implementing a method provided by any of the aforesaid embodiments.

Figure 19:
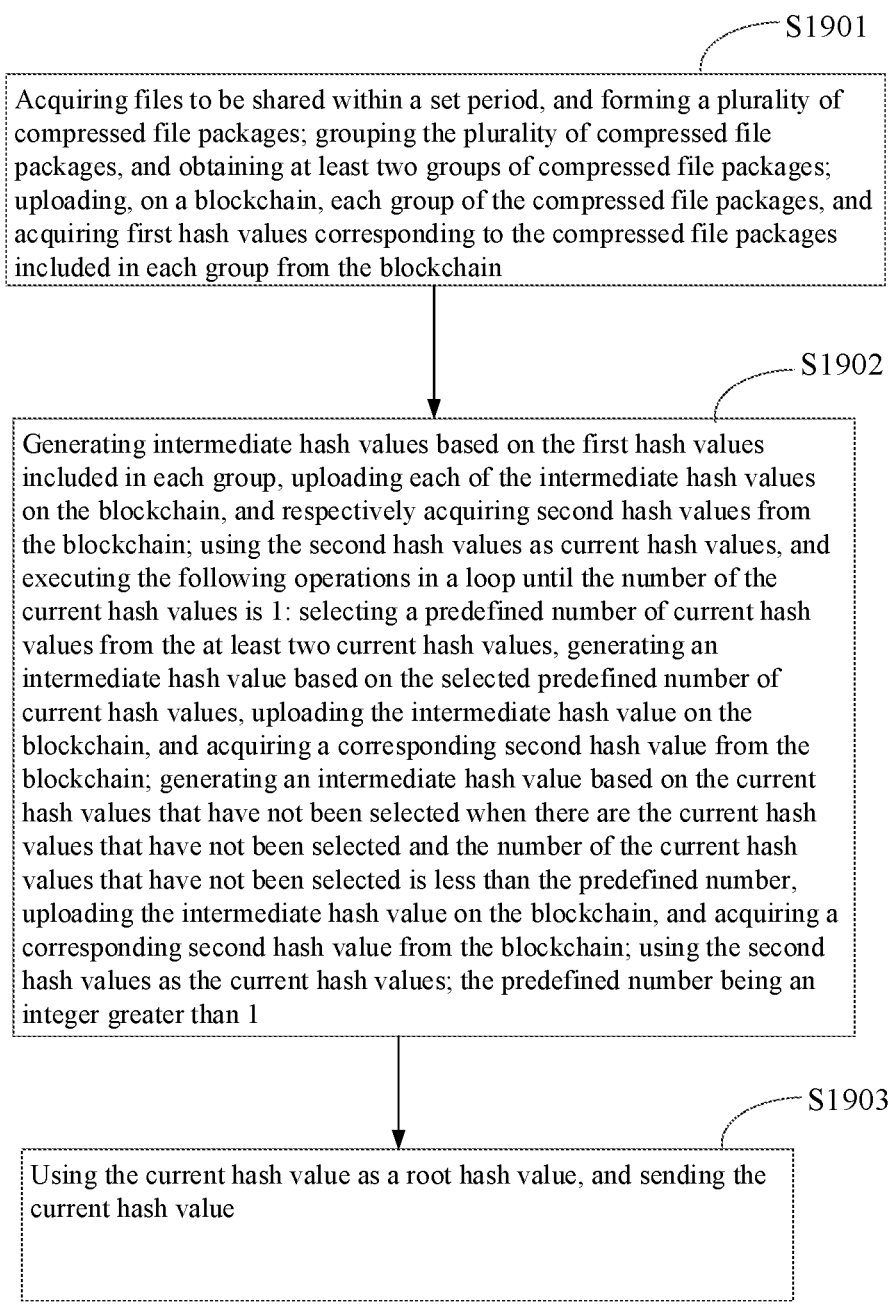
FIG. 19 is a schematic diagram of a flow of a method for storing shared files provided by the third embodiment of the disclosure.

As shown in FIG. 19, the third embodiment of the disclosure provides a method for storing shared files, and the method may comprise the following steps:

Step S1901: acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain.

Specifically, the files to be shared may be transaction files produced by an electronic bank, statement files produced by an electronic bank, order files generated by an electronic mall, and so on; the disclosure does not limit the format and content of the files to be shared; the files to be shared within a set period are acquired, and the files to be shared are produced within the set period, for example, transaction files produced by an electronic bank within one hour, statement files produced by two electronic banks within one hour, order files produced by an electronic mall within one day, and so on, and the set period may be set in accordance with the service scenario and the number of the produced files, for example, one day, one hour, 30 minutes, and so on; the disclosure does not limit the specific concept of the set period.

Further, the step of acquiring files to be shared within a set period, and forming a plurality of compressed file packages comprises: acquiring files to be shared within a set period, forming a plurality of file packages, and determining the number of files in the file packages in accordance with a network bandwidth. Further, the step of acquiring files to be shared within a predefined time range, and forming a plurality of compressed file packages in accordance with the number and size of the files further comprises executing compressing and enciphering operations, which improves the security of the files by enciphering, and in particular improves the security of the files with high security requirements such as statements between electronic banks; that is, the file packages are compressed and enciphered respectively to form the compressed file packages. As for the enciphering method, compression software may be used for enciphering, or an operating system or enciphering software may be used for enciphering, and the disclosure does not limit the specific methods for compression and enciphering.

Furthermore, the plurality of compressed file packages are grouped, and at least two groups of compressed file packages are obtained; specifically, there are two grouping methods below.

The first method: using a plurality of compressed file packages formed within a set piecewise period as a group of compressed file packages, and obtaining at least two groups of compressed file packages, the set period including at least two set piecewise periods. Specifically, the set period includes at least two set piecewise periods, for example, the set piecewise period is 5 minutes, the set period is 30 minutes, and it may be seen that the set period includes 6 set piecewise periods; further, a plurality of compressed file packages formed within one 5 minutes are used as a group of compressed file packages; a plurality of compressed file packages formed within another 5 minutes are used as another group of compressed file packages; it may be understood that the respective set piecewise periods are sequential in time; that is, the plurality of compressed file packages respectively formed within at least two set piecewise periods are used as a group of compressed file packages, and at least two groups of compressed file packages are obtained. The set period includes at least two set piecewise periods; it may be understood that the method is to dynamically form compressed file packages; so the number of compressed file packages in each group is variable, which increases the file sharing flexibility.

The second method: grouping the plurality of compressed file packages in accordance with the set file number, and obtaining at least two groups of compressed file packages. Specifically, the set file number is defined in accordance with the total number of files to be shared and the scenario, for example, if the set file number is 1,000, every 1,000 compressed file packages form a group, for example, the set period is 30 minutes, 10,000 compressed file packages are formed within 30 minutes, and then the compressed file packages are divided into 10 groups of compressed file packages in accordance with the set file number of 1,000; that is, the plurality of compressed file packages are grouped in accordance with the set file number, and at least two groups of compressed file packages are obtained.

Further, each group of the compressed file packages are uploaded on the blockchain, wherein the compressed file packages may be respectively used as transactions to be uploaded on the blockchain, and the hash values returned with respect to the transactions are respectively acquired from the blockchain, the hash values being just the first hash values corresponding to the compressed file packages; for example, the compressed file packages are divided into a total of 10 groups of compressed file packages using the aforesaid first method or second method for grouping, then each of the compressed file packages in each group is uploaded on the blockchain, and corresponding first hash values are respectively acquired from the blockchain, the first hash values being just the hash values of the compressed file packages, for example, the group 1 includes 1,000 compressed file packages, and then corresponding 1,000 first hash values are acquired; further, intermediate hash values are generated based on the first hash values included in each group, each of the intermediate hash values is uploaded on the blockchain, and corresponding second hash values are respectively acquired from the blockchain; specifically, as for generating intermediate hash values based on the first hash values included in each group, the first hash values included in each group may be combined to generate intermediate hash values, or the respective first hash values may be calculated to generate intermediate hash values, for example, an intermediate hash value is generated by means of calculation based on the 1,000 first hash values in the group 1, the intermediate hash value is uploaded on the blockchain, and a corresponding second hash value is acquired from the blockchain; the disclosure does not limit the specific method for generating the intermediate hash values based on the first hash values included in each group. Further, the intermediate hash values generated based on the first hash values included in each group may be respectively used as transactions to be uploaded on the blockchain, and the hash values returned with respect to the transactions are respectively acquired from the blockchain; the disclosure does not limit the values of the set period, the set piecewise period, and the set file number.

Further, the step of uploading, on a blockchain, each group of the compressed file packages further comprises: uploading the compressed file packages included in each group on the blockchain concurrently. Since there is no dependent transaction relationship between the respective compressed file packages included in each group, the compressed file packages are uploaded concurrently; it may be understood that due to the existence of limitations of resources such as the network bandwidth, a plurality of compressed file packages may be uploaded in batches, the compressed file packages in each batch are uploaded concurrently, and by the simultaneous uploading operations, the file uploading efficiency is improved; wherein the blockchain used may be an alliance chain, a private chain, and so on, and the disclosure does not limit the type of the blockchain. The disclosure does not limit the specific tool or method used for executing a blockchain uploading operation.

Step S1902: using the second hash values as current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1.

Specifically, the compressed file packages are divided into a total of 10 groups of compressed file packages in accordance with the first method or second method for grouping as described in step S1901, and then corresponding first hash values are respectively acquired with respect to the respective compressed file packages in each group; the first hash values are just the hash values of the compressed file packages. Intermediate hash values are generated based on the first hash values included in each group, each of the intermediate hash values is uploaded on the blockchain, and corresponding second hash values are respectively acquired from the blockchain; wherein the first hash values included in each group may be respectively used as transactions to be uploaded on the blockchain, and the second hash values returned with respect to the transactions are respectively acquired from the blockchain; for example, the first hash values in each of the 10 groups are based on, for example, the group 1 includes 1,000 compressed file packages, then there are 1,000 corresponding first hash values, an intermediate hash value is generated based on the 1,000 first hash values, the intermediate hash value is uploaded on the blockchain, and a corresponding second hash value is acquired from the blockchain; similarly, 10 second hash values are respectively acquired in accordance with the first hash values in each group.

Further, the second hash values are used as current hash values, and the following operations are executed in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; wherein as for generating an intermediate hash value based on the selected predefined number of current hash values, the selected predefined number of current hash values may be combined to generate an intermediate hash value, or the selected predefined number of current hash values may be calculated to generate an intermediate hash value, the intermediate hash value is used as a transaction to be uploaded on the blockchain, and a corresponding second hash value is acquired from the blockchain; the disclosure does not limit the specific method for generating the intermediate hash value based on the selected predefined number of current hash values.

Further, an intermediate hash value is generated based on the current hash values that have not been selected in case there are the current hash values that have not been selected and the number of the current hash values that have not been selected is less than the predefined number, the intermediate hash value is uploaded on the blockchain, and a corresponding second hash value is acquired from the blockchain; the second hash values are used as the current hash values. The predefined number is an integer greater than 1, for example, 2, 3, 4, 10, 100, and 1000, the predefined number is used as the number of ways of the tree-shaped structure formed by the second hash values, and the predefined number may be determined in accordance with the service scenario or the number of the compressed file packages; the disclosure does not limit the specific value of the predefined number.

In the process of making executions in a loop, the second hash values are used as the current hash values; it may be understood that according to the aforesaid descriptions, the hash values on the respective levels are acquired by making executions in a loop until a unique root hash value is acquired (that is, until the number of the current hash values is 1), and a tree-shaped hash value storage structure is formed. By the aforesaid method, the file acquiring complexity is increased, so the security of the files is improved.

An example is given below to illustrate the aforesaid process, for example, with respect to 99 groups of compressed file packages, 99 second hash values are correspondingly acquired; the predefined number is set to 5; then the second hash values are used as the current hash values, and the following operations are executed in a loop until the number of the current hash values is 1: that is, the 99 second hash values are used as the current hash values, and the following operations are executed in a loop:

respectively selecting the predefined number (e.g., 5) of current hash values from the 99 second hash values (current hash values), performing a blockchain uploading operation in accordance with the selected predefined number of current hash values, and acquiring a corresponding second hash value from the blockchain; it may be understood that the predefined number (5) of current hash values are respectively selected from the 99 second hash values, the selected 5 hash values are uploaded on the blockchain, and a corresponding hash values is acquired from the blockchain; by the aforesaid operations, 19 second hash values are acquired.

Further, 95 (19*5) current hash values among the 99 current hash values correspond to the 19 second hash values, there are still 4 current hash values that have not been selected, in case the number of the current hash values that have not been selected is less than the predefined number (5), an intermediate hash value is generated based on the 4 current hash values, the intermediate hash value is uploaded on the blockchain, and a corresponding second hash value is acquired from the blockchain; that is, an intermediate hash value is generated based on the current hash values that have not been selected in case there are the current hash values that have not been selected and the number of the current hash values that have not been selected is less than the set number, the intermediate hash value is uploaded on the blockchain, and a corresponding second hash value is acquired from the blockchain.

The aforesaid example steps describe that 20 second hash values are acquired based on the 99 current hash values, the 20 second hash values are used as the current hash values, and the aforesaid steps are executed in a loop; it may be similarly seen that 5 (predefined number) current hash values are respectively selected from the 20 current hash values to be uploaded on the blockchain, a corresponding next-level second hash value is acquired from the blockchain, and it may be seen that 4 second hash values (current hash values) are acquired; further, 1 second hash value is acquired, that is, until the number of the current hash values is 1; the operations executed in a loop are stopped; according to the aforesaid descriptions, the uploading operation and acquiring hash values are executed in a loop until a unique root hash value is acquired, and a hash value storage structure of a multi-way tree is formed. By the aforesaid method, the file acquiring complexity is increased, so the security of the files is improved.

Step S1903: using the current hash value as a root hash value, and sending the current hash value.

Specifically, in accordance with the storage structure of the multi-way tree described in step S1902, after making executions in a loop, the root hash value is acquired and the root hash value is sent.

Figure 31:
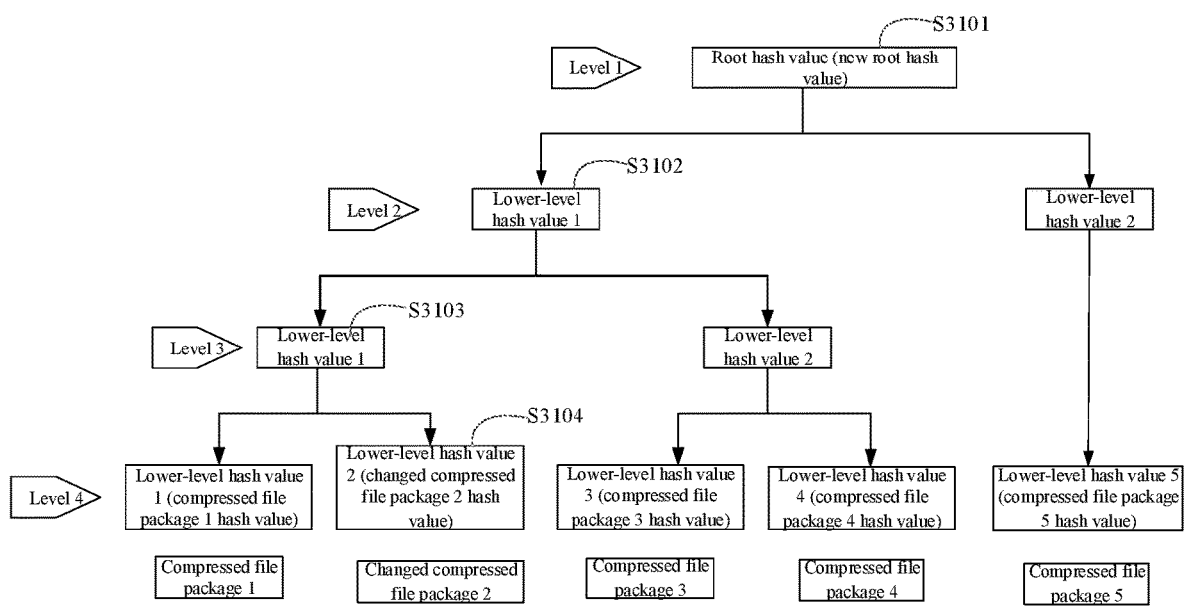
FIG. 31 is a schematic diagram of a flow of acquiring an updated file provided by the fourth embodiment of the disclosure.

There are two methods for sending the root hash value: 1) sending the root hash value to an acquirer having an authority to acquire the shared files by a blockchain; 2) sending the root hash value to an acquirer having an authority to acquire the shared files in other manners, for example, an official email, and so no; it may be understood that the root hash value is sent to an acquirer having an authority to acquire the shared files, and the acquirer having the authority may be one or more parties; for example, the files are statements produced by bank A and bank B within a predefined time range; the root hash value is produced after step S1901-step S1903, and then the root hash value is sent to the bank A and the bank B having the authorities to acquire these statement files; obviously, the security of the files is further improved using the operations. A further example relating to the flow of step S1901-step S1903 is as shown in FIG. 31.

Figure 20:
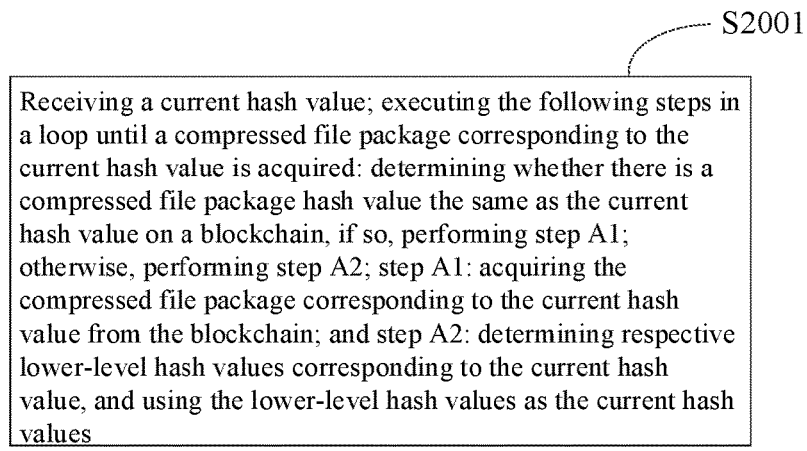
FIG. 20 is a schematic diagram of a flow of acquiring shared files provided by the third embodiment of the disclosure.

As shown in FIG. 20, the third embodiment of the disclosure provides a method for acquiring shared files, and the method may comprise the following steps:

Step S2001: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values; specifically, the descriptions of the method for acquiring the files in the compressed file package corresponding to the compressed file package hash value from the blockchain in accordance with the root hash value are consistent with the descriptions of the examples of step S2201-step S2203, and no unnecessary details are further given herein.

Figure 21:
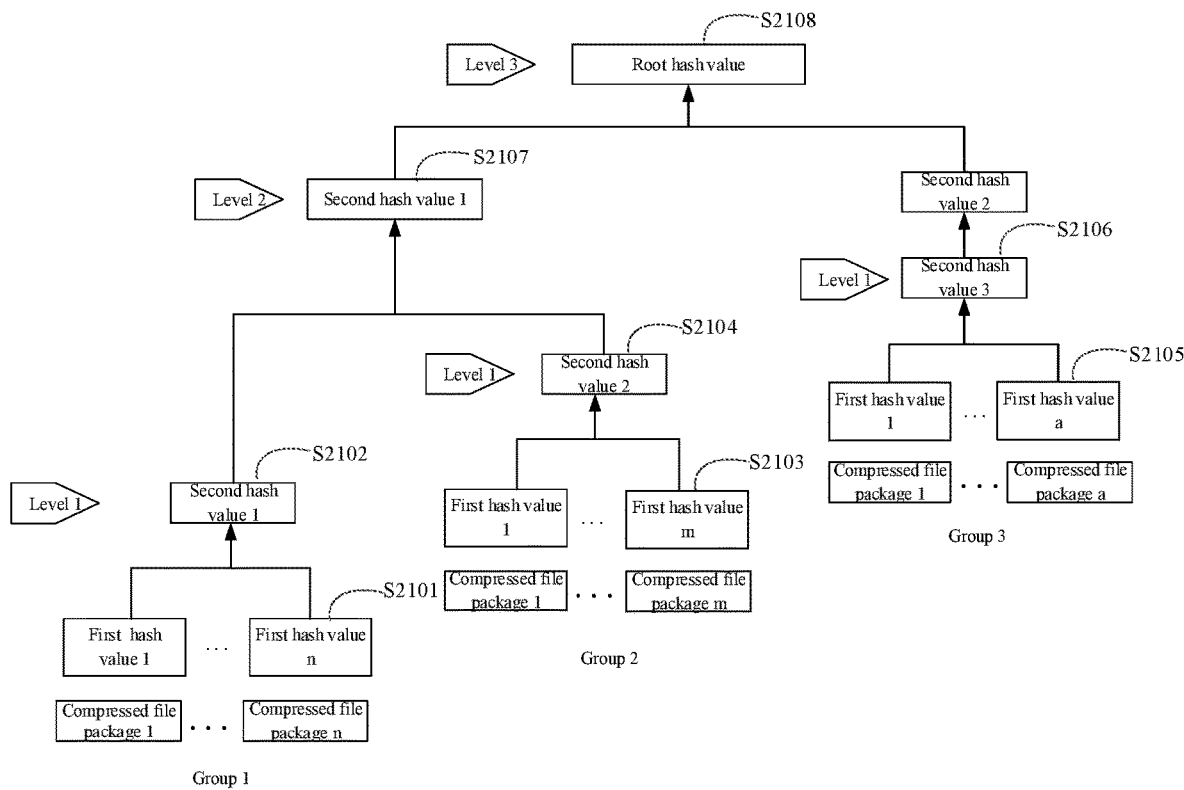
FIG. 21 is a schematic diagram of storing shared file hash values using a predefined time range and a multi-way tree structure provided by the third embodiment of the disclosure.

As shown in FIG. 21, the third embodiment of the disclosure provides a method for storing shared file hash values using a multi-way structure, and the method may comprise the following steps:

Step S2101: uploading the compressed file packages in the group 1 on the blockchain, and acquiring n first hash values corresponding to the compressed file packages included in each group from the blockchain.

In the example as shown in FIG. 21, the group 1 includes the compressed file package 1-compressed file package n; it may be understood that in the two grouping methods as described in step S1902, the compressed file package 1-compressed file package n may be the respective compressed file packages formed within a set piecewise period; or may be a set file number of compressed file packages, and n is just the set file number; further, each compressed file package in the group 1 is uploaded on the blockchain, and corresponding first hash values corresponding to the compressed file packages included in each group are acquired from the blockchain; for example, the compressed file package 1 is uploaded on the blockchain, and a corresponding first hash value is acquired from the blockchain, wherein the compressed file package 1 may be used as a transaction to be uploaded on the blockchain, and a first hash value, for example, the first hash value 1, with respect to the transaction is acquired from the blockchain; and so on, the compressed file package n is uploaded on the blockchain, and the corresponding first hash value n is acquired from the blockchain; it may be understood that the number n of the compressed file packages may be tens, hundreds, tens of thousands, hundreds of thousands, millions, tens of millions, and so on; that is, each group of the compressed file packages are uploaded on the blockchain, and corresponding first hash values corresponding to the compressed hash values included in each group are acquired from the blockchain.

Step S2102: uploading the first hash values included in the group 1 on the blockchain, and acquiring a corresponding second hash value 1 from the blockchain; as described in step S2101, first hash values, i.e., the first hash value 1-the first hash value n, corresponding to the n compressed file packages are acquired in accordance with the n compressed file packages in the group 1; further, an intermediate hash value is generated based on the n first hash values, the intermediate hash value is uploaded on the blockchain, and a corresponding second hash value (second hash value 1) is acquired from the blockchain; the number of the second hash values is 1; that is, one second hash value is acquired in accordance with the respective first hash values in one group; that is, intermediate hash values are generated based on the first hash values included in each group, each of the intermediate hash values is uploaded on the blockchain, and corresponding second hash values are respectively acquired from the blockchain.

Step S2103: uploading the compressed file packages in the group 2 on the blockchain, and acquiring m first hash values corresponding to the compressed file packages included in the group 2 from the blockchain.

Step S2104: generating an intermediate hash value based on the first hash values included in the group 2, uploading the intermediate hash value on the blockchain, and acquiring a corresponding second hash value 2 from the blockchain.

The descriptions of step S2103-step S2104 are similar to the descriptions of step S2101-step S2102; it may be understood that in the two grouping methods as described in step S1902, the compressed file package 1-the compressed file package m may be the respective compressed file packages formed within a set piecewise period; or may be a set file number of compressed file packages, and m is just the set file number.

Further, when the grouping method with the set piecewise period is used, m may be of a different value from n in step S2102; when the grouping method with the set file number is used, m is of the same value as n in step S2101-step S2102; both m and n are equal to the set file number.

Step S2105: uploading the compressed file packages in the group 3 on the blockchain, and acquiring a first hash values corresponding to the compressed file packages included in the group 3 from the blockchain.

Step S2106: generating an intermediate hash value based on the first hash values included in the group 3, uploading the intermediate hash value on the blockchain, and acquiring a corresponding second hash value 3 from the blockchain.

The descriptions of step S2105-step S2106 are similar to the descriptions of step S2103-step S2104, and no unnecessary details are further given herein.

Step S2107: acquiring the current hash value.

Specifically, the second hash value 1, the second hash value 2, and the second hash value 3 acquired in step S2101-step S2106 are used as the current hash values; a predefined number (e.g., 2) of current hash values are selected, the selected predefined number of current hash values (e.g., the second hash value 1 and the second hash value 2 on the level 1) are uploaded on the blockchain, and a corresponding second hash value (e.g., the second hash value 1 on the level 2) is acquired from the blockchain; further, an intermediate hash value is generated based on the current hash values that have not been selected in case there are the current hash values (second hash value 3) that have not been selected and the number of the current hash values that have not been selected is less than the predefined number (1<2), the intermediate hash value is uploaded on the blockchain, and a corresponding second hash value (e.g., the second hash value 2 on the level 2) is acquired from the blockchain.

That is, the second hash values are used as the current hash values, and the following operations are executed in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1.

Step S2108: using the current hash value as a root hash value.

Specifically, using the current hash value as a root hash value, and sending the current hash value. The operation of step S2107 is executed until the number of the current hash values (the root hash value on the level 3) is 1, then the current hash value is used as the root hash value, and the current hash value is sent.

As shown in FIG. 22, the third embodiment of the disclosure provides a method for acquiring shared files based on hash values of a multi-way tree structure, and the method may comprise the following steps:

Step S2201-step S2203 below take the examples descried in step S2101-step S2103 as examples to illustrate the method for acquiring shared files based on hash values of a multi-way tree structure.

Step S2201: in accordance with a current hash value (root hash value).

Specifically, a current hash value is received; it is determined whether there is a compressed file package hash value the same as the current hash value on the blockchain.

As shown in FIG. 22, it is determined that there is no compressed file package hash value the same as the current hash value on the blockchain, that is, the current hash value is not the compressed file package hash value, then a predefined number of lower-level hash values corresponding to the current hash value are determined, and the lower-level hash values are used as the current hash values; the lower-level hash values of the current hash value are respectively the lower-level hash value 1, the lower-level hash value 2, and the lower-level hash value 3; and the lower-level hash values are used as the current hash values.

Step S2202: executing the operations of acquiring lower-level hash values in a loop.

The example of the process of traversing hash values on respective levels below the root hash value and acquiring compressed file packages is described below; specifically, as shown in FIG. 22, the current hash values (lower-level hash value 1, lower-level hash value 2) are received; it is determined that there is no compressed file package hash value the same as the current hash value (lower-level hash value 1) on the blockchain; then respective lower-level hash values corresponding to the current hash value are determined, and the lower-level hash values are used as the current hash values, for example, it is determined that the respective sub-hash values corresponding to the lower-level hash value 1 (level 2) are the lower-level hash value 1-the lower level hash value 2 (level 3); further, it is determined there is a compressed file package hash value (lower-level hash value 1-lower-level hash value a) the same as the current hash value (lower-level hash value 2) on the blockchain; then the compressed file packages corresponding to the current hash value are acquired from the blockchain; the compressed file packages are respectively the lower-level hash value 1-the lower-level hash value a; further, the aforesaid steps are executed in a loop on the lower-level hash value 1 and the lower-level hash value 2 on the level 3, and the compressed file packages corresponding to the current hash values are acquired from the blockchain; that is, a current hash value is received; the following steps are executed in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

Step S2204: acquiring a compressed file package and files in the compressed file package in accordance with the first hash value of the compressed file package. Specifically, the step of acquiring the compressed file package corresponding to the current hash value comprises: acquiring the compressed file package corresponding to the current hash value, and decompressing and deciphering the compressed file package to acquire files in the compressed file package; specifically, each of the acquired compressed file packages is decompressed and deciphered, and the decompressing and deciphering methods correspond to the compressing and enciphering methods.

Figure 23:
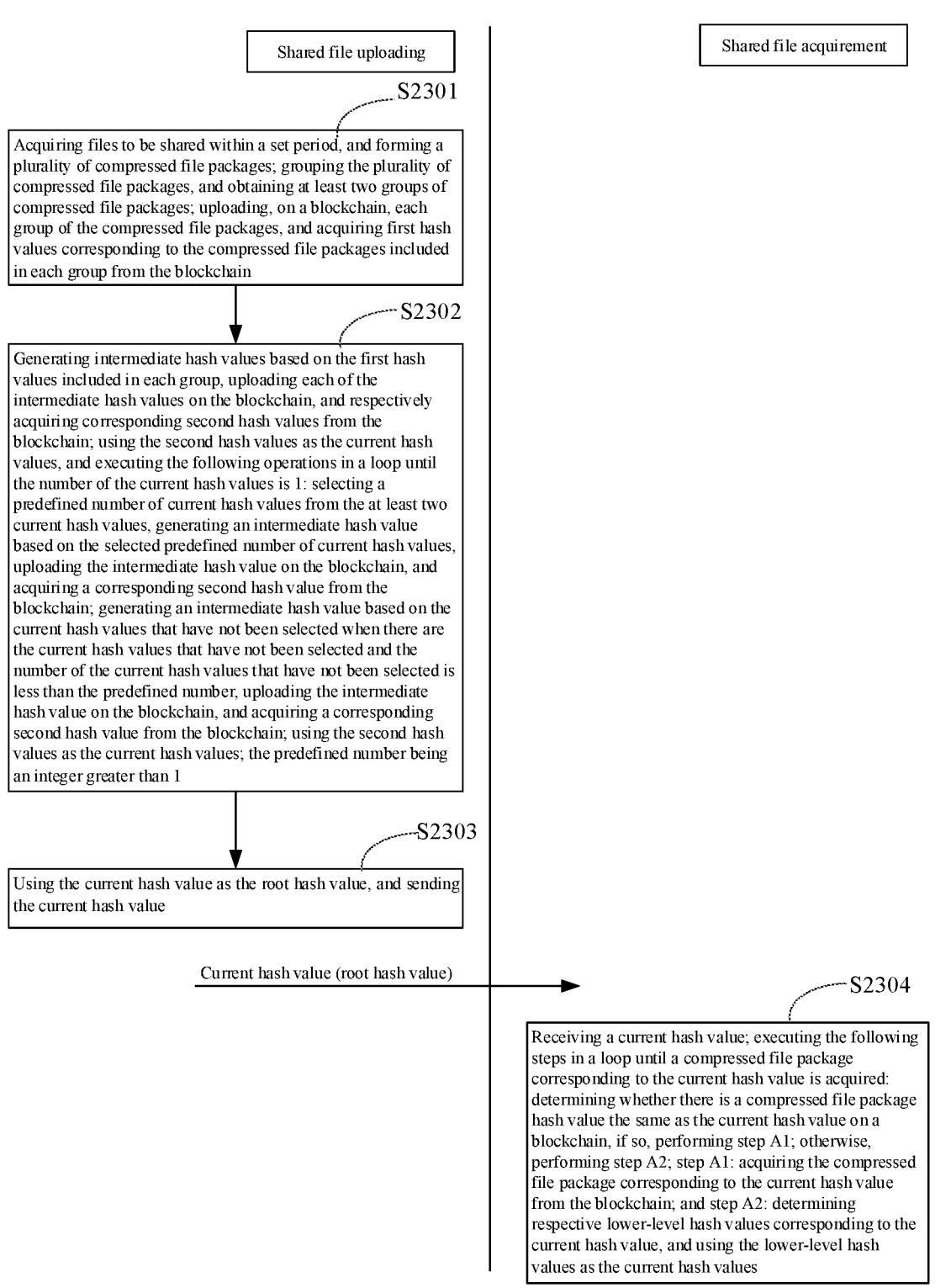
FIG. 23 is a schematic diagram of a flow of sharing files provided by the third embodiment of the disclosure.

As shown in FIG. 23, the third embodiment of the disclosure provides a flow of sharing files, and the flow comprises the following steps:

In the schematic flowchart as shown in FIG. 23, step S2301-step S2303 are used to describe a process of uploading shared files; step S2304 is used to describe a process of acquiring shared files by a shared file acquirer; for example, bank headquarters may upload the shared files, and the shared file acquirer may be an enterprise directly related to the shared files in terms of the service, for example, bank 1, bank 2, bank 3, and so on.

Step S2301: acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain.

Specifically, the descriptions relating to forming and uploading the compressed file packages are consistent with the descriptions of step S1901, and no unnecessary details are further given herein; further, the step of grouping the plurality of compressed file packages, and acquiring at least two groups of compressed file packages comprising: using a plurality of compressed file packages formed within a set piecewise period as a group of compressed file packages, and obtaining at least two groups of compressed file packages, the set period including at least two set piecewise periods. The step of grouping the plurality of compressed file packages, and obtaining at least two groups of compressed file packages comprises: grouping the plurality of compressed file packages in accordance with a set file number, and obtaining at least two groups of compressed file packages.

Furthermore, the step of acquiring files to be shared within a set period, and forming a plurality of compressed file packages comprises: acquiring files to be shared within a set period, forming a plurality of file packages, and determining the number of files in the file packages in accordance with a network bandwidth. Furthermore, each group of the file packages are compressed and enciphered respectively to form the compressed file packages. The compressed file packages included in each group are uploaded on the blockchain concurrently.

Step S2302: generating intermediate hash values based on the first hash values included in each group, uploading each of the intermediate hash values on the blockchain, and respectively acquiring corresponding second hash values from the blockchain; using the second hash values as the current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1.

Specifically, the descriptions relating to acquiring the second hash value (current hash value) are consistent with the descriptions of step S1902, and no unnecessary details are further given herein.

Step S2303: using the current hash value as the root hash value, and sending the current hash value.

Specifically, the descriptions relating to sending the root hash value are consistent with the descriptions of step S1903, and no unnecessary details are further given herein.

Step S2304: receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2;
  step A1: acquiring the compressed file package corresponding to the current hash value from the blockchain; and step A2: determining respective lower-level hash values corresponding to the current hash value, and using the lower-level hash values as the current hash values.

Specifically, the descriptions relating to acquiring the root hash value and uploading the hash values on the respective levels are consistent with the descriptions of step S2001, and no unnecessary details are further given herein; further, the step of acquiring the compressed file package corresponding to the current hash value comprises: acquiring the compressed file package corresponding to the current hash value, and decompressing and deciphering the compressed file package to acquire the files in the compressed file package.

Figure 24:
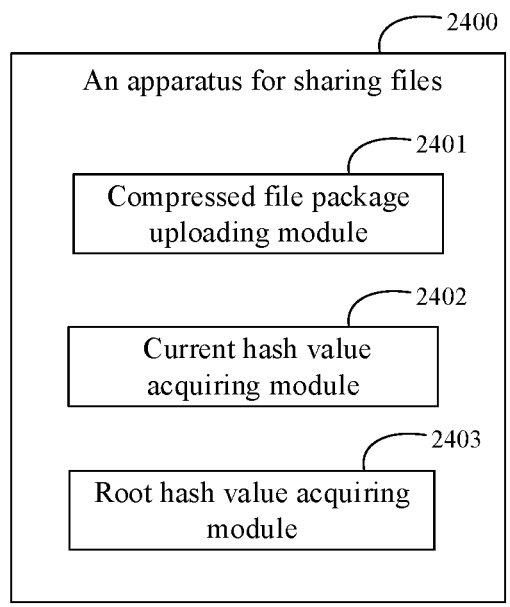
FIG. 24 is a schematic diagram of a structure of an apparatus for sharing files provided by the third embodiment of the disclosure.

As shown in FIG. 24, the third embodiment of the disclosure provides an apparatus for sharing files 2400, comprising: a compressed file package uploading module 2401, a current hash value acquiring module 2402 and a root hash value acquiring module 2403; wherein,
  the compressed file package uploading module 2401 is used for acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain;
  the current hash value acquiring module 2402 is used for generating intermediate hash values based on the first hash values included in each group, uploading each of the intermediate hash values on the blockchain, and respectively acquiring second hash values from the blockchain; using the second hash values as current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1; and
  the root hash value acquiring module 2403 is used for using the current hash value as a root hash value, and sending the root hash value.

Figure 25:
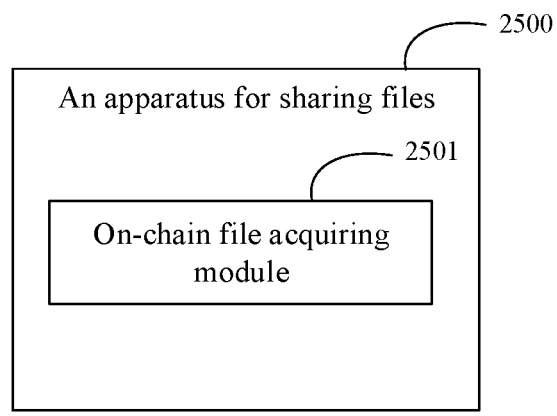
FIG. 25 is a schematic diagram of a structure of an apparatus for acquiring shared files provided by the third embodiment of the disclosure.

As shown in FIG. 25, the third embodiment of the disclosure provides an apparatus for sharing files 2500, comprising: an on-chain file acquiring module 2501; wherein, the on-chain file acquiring module 2501 is used for receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

Figure 26:
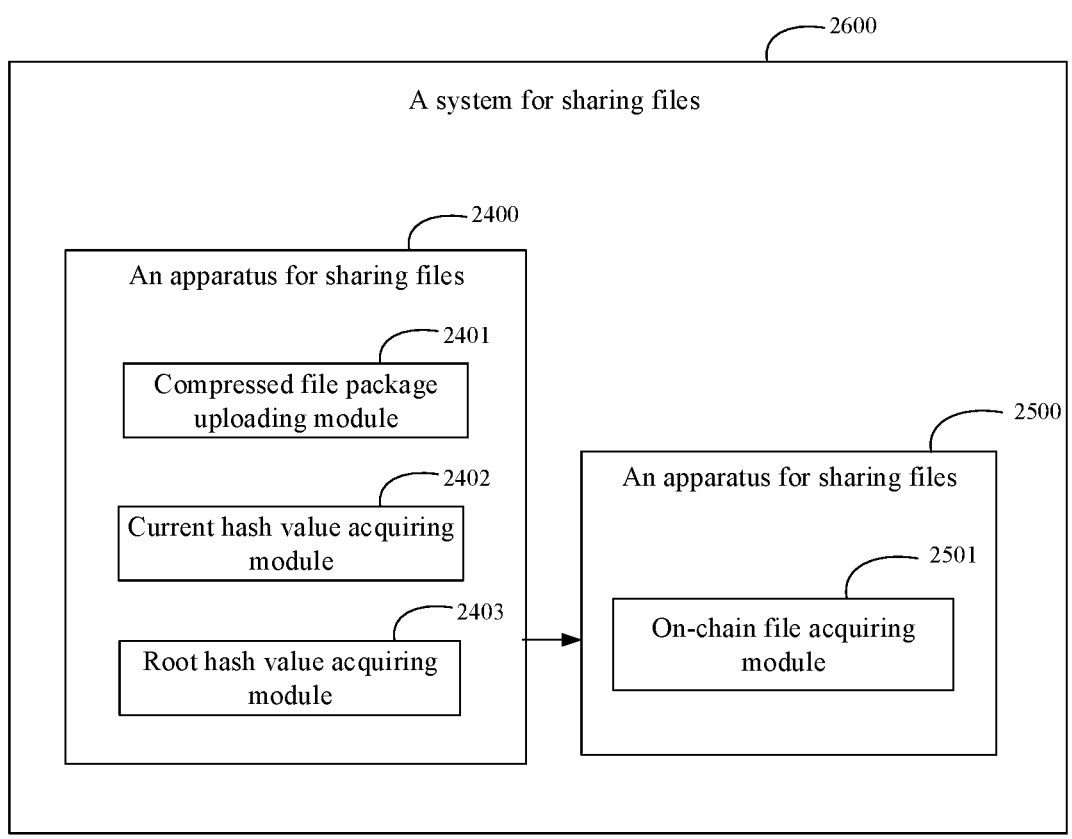
FIG. 26 is a schematic diagram of a structure of a system for acquiring shared files provided by the third embodiment of the disclosure.

As shown in FIG. 26, the third embodiment of the disclosure provides a system for sharing files 2600, comprising: an apparatus for sharing files 2400 provided by the third embodiment of the disclosure and an apparatus for sharing files 2500 provided by the third embodiment of the disclosure.

The third embodiment of the disclosure further provides a file sharing electronic device, comprising: one or more processors; and a storage means for storing one or more programs, the one or more programs, when executed by the one or more processors, causing the one or more processors to implement a method provided by any of the aforesaid embodiments.

The third embodiment of the disclosure further provides a computer-readable medium, on which medium a computer program is stored, the program, when executed by a processor, implementing a method provided by any of the aforesaid embodiments.

Figure 27:
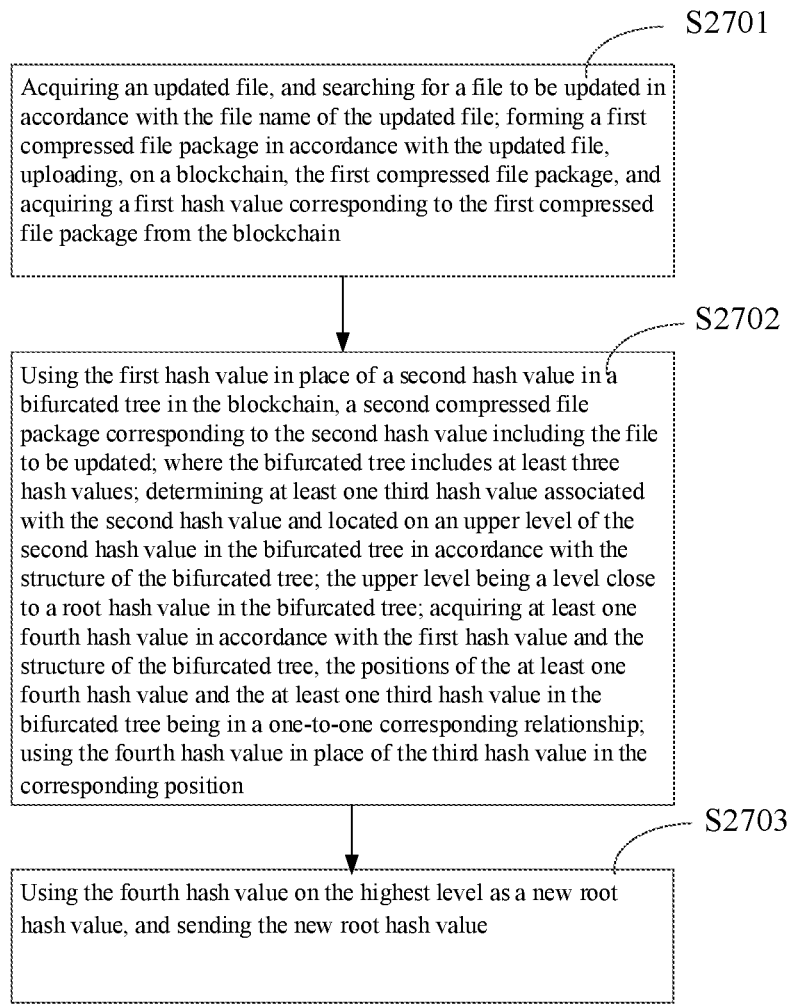
FIG. 27 is a schematic diagram of a flow of a method for updating files provided by the fourth embodiment of the disclosure.

As shown in FIG. 27, the fourth embodiment of the disclosure provides a method for storing shared files, and the method may comprise the following steps:

Step S2701: acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain.

Specifically, there is a case where it is required to update a file that has been stored on a blockchain in a specific scenario, and when an updated file is acquired, a file to be updated may be searched for in accordance with the file name of the updated file; the file to be updated may be stored in one compressed file package, or may be stored in a plurality of compressed file packages, wherein the compressed file package to which the file to be updated belongs may be acquired from a local storage medium synchronous with the blockchain, or may be acquired from the blockchain; further, the step of forming a first compressed file package in accordance with the updated file comprises: searching for a second file package where the file to be updated is located in accordance with the file name of the updated file, and in case the second file package includes other files than the file to be updated, generating a first file package in accordance with the other files and the updated file.

It may be understood that the updated file and the file to be updated have the same file name, and the second file package where the file to be updated is located is searched for by the file name, for example, the compressed file package 1 (which is the file name of the second compressed file package corresponding to the second file package) includes 100 files, among which "file 99.aa" is a file to be updated, the other 99 files are files that are not required to be updated, and then the updated file "file 99.aa" is used in place of the file to be updated having the same file name, and forms a new file package (i.e., first file package) together with the other 99 files (i.e., including other files than the file to be updated); further, the first file package is compressed and enciphered to form the first compressed file package. It may be understood that the respective compressed file packages have been included on the blockchain.

Furthermore, the first compressed file package is uploaded on the blockchain, and the first hash value corresponding to the first compressed file package is acquired from the blockchain; the first compressed file package that has been uploaded is a compressed package including the updated file, and is used in place of the original compressed file package; wherein the first compressed file package may be used as a transaction to be uploaded on the blockchain, and the hash value returned with respect to the transaction is acquired from the blockchain, the hash value being just the first hash value of the compressed file package, that is, the first hash value corresponding to the first compressed file package; the blockchain used may be an alliance chain, a private chain, and so on, and the disclosure does not limit the type of the blockchain. The disclosure does not limit the specific tool or method used for executing a blockchain uploading operation.

Step S2702: using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position.

using the first hash value in place of a second hash value in a bifurcated tree in the blockchain, a second compressed file package corresponding to the second hash value including the file to be updated; the bifurcated tree including at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position; and using the fourth hash value on the highest level as a new root hash value, and sending the new root hash value.

Figure 29:
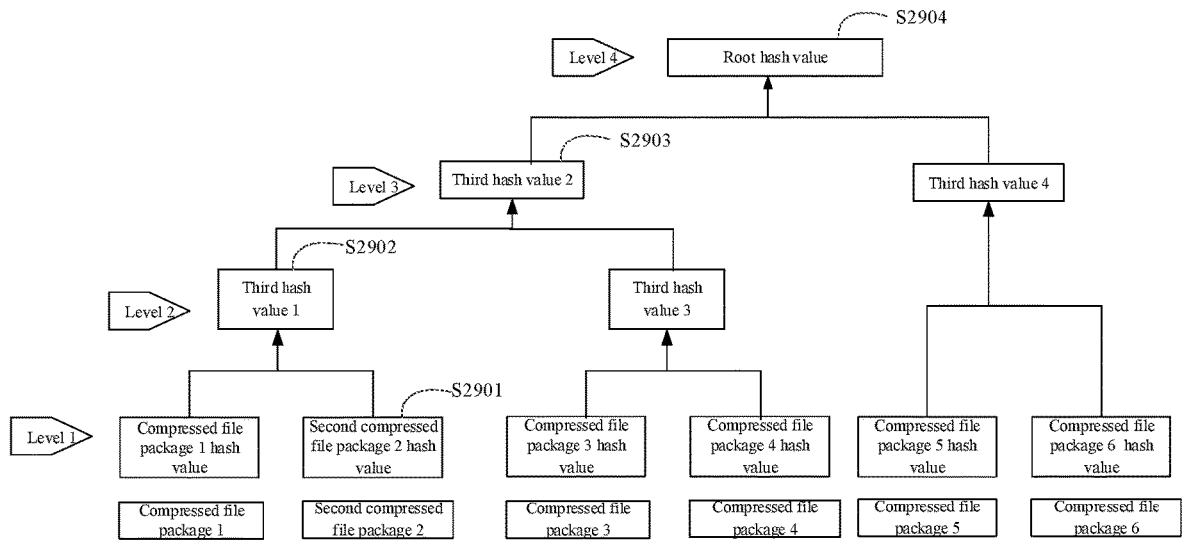
FIG. 29 is a schematic diagram of storing shared file hash values using a tree structure provided by the fourth embodiment of the disclosure.
Figure 30:
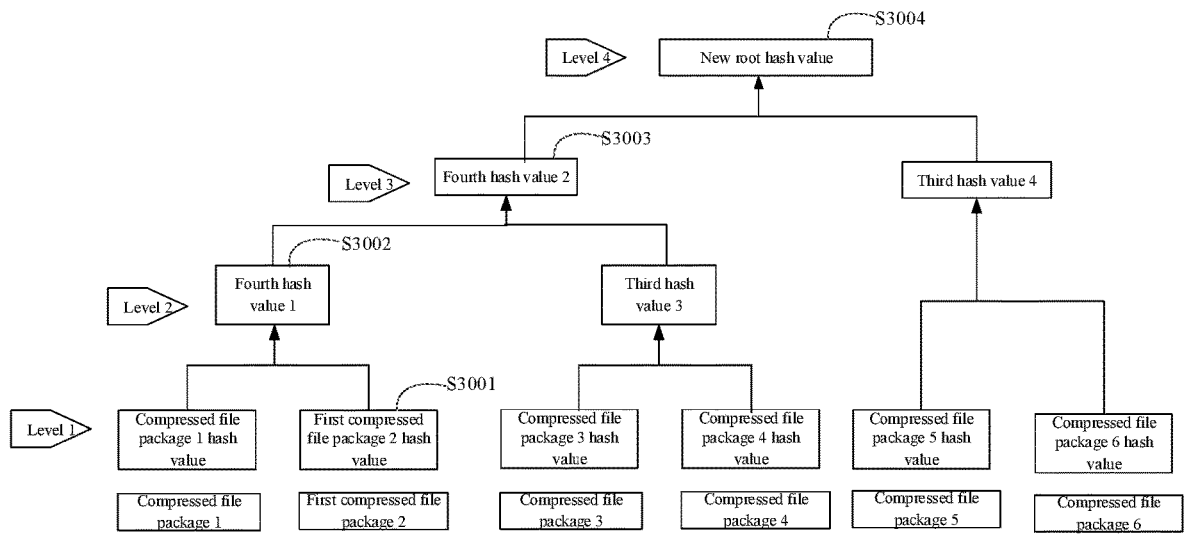
FIG. 30 is a schematic diagram of storing updated file hash values using a tree structure provided by the fourth embodiment of the disclosure.

Specifically, the examples of FIG. 29 and corresponding FIG. 30 are taken into consideration below for illustrations; wherein FIG. 29 shows a tree-shaped structure not including an updated file; FIG. 30 shows a tree-shaped structure including the updated file that is updated based on the tree-shaped structure of FIG. 29.

S1: using the first hash value in place of the second hash value in the bifurcated tree in the blockchain.

In step S2901 as shown in FIG. 29, the file package 2 hash value is the second hash value in the bifurcated tree; correspondingly, in step S3001 as shown in FIG. 30, the first file package 2 hash value is the first hash value in the bifurcated tree; wherein the first compressed file package (first compressed file package 2) corresponding to the first hash value (first compressed file package 2 hash value) in step S3001 includes the updated file.

The second compressed file package (second compressed file package 2) corresponding to the second hash value (second compressed file package 2 hash value) in step S2901 includes the file to be updated having the same file name; that is, the first hash value is used in place of the second hash value in the bifurcated tree in the blockchain, and the second compressed file package corresponding to the second hash value includes the file to be updated; further, the bifurcated trees as shown in FIG. 29 and FIG. 30 respectively include 11 hash values; that is, the bifurcated tree includes at least three hash values; it may be understood that the bifurcated tree may be a bifurcated tree having a set number of ways, for example, a binary tree, a ten-way tree, a one hundred-way tree, and so on; or may be a bifurcated tree having an unfixed number of ways, and the disclosure does not limit the specific shape and content of the bifurcated tree.

S2: determining at least one third hash value associated with the second hash value and located on an upper level of the second hash value in the bifurcated tree in accordance with the structure of the bifurcated tree; the upper level being a level close to a root hash value in the bifurcated tree; in step S2902 as shown in FIG. 29, at least one third hash value associated with the second hash value (second compressed file package 2 hash value) and located on an upper level of the second hash value in the bifurcated tree (the bifurcated tree shown in FIG. 29) (as shown in FIG. 29, the third hash value 1, the third hash value 2, and the root hash value are associated with the second hash value and located on an upper level of the second hash value), and as shown in FIG. 29, relative to the second hash value (second compressed file package 2 hash value), the level on which the third hash value 1 is located is a level close to the root hash value; relative to the third hash value 1, the level on which the third hash value 2 is located is a level close to the root hash value.

S3: acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position.

Specifically, in step S3002 as shown in FIG. 30, at least one fourth hash value (the fourth hash value 1 as shown in FIG. 30) is acquired in accordance with the first hash value (the first compressed file package 2 hash value as shown in FIG. 30) and the structure of the bifurcated tree (the bifurcated tree as shown in FIG. 29 or FIG. 30), the positions of the at least one fourth hash value (the fourth hash value 1 as shown in FIG. 30) and the at least one third hash value (the third hash value 1 as shown in FIG. 29) in the bifurcated tree (the bifurcated tree as shown in FIG. 29 or FIG. 30) being in a one-to-one corresponding relationship.

It may be understood that the method for acquiring the at least one fourth hash value (e.g., the fourth hash value 1 as shown in FIG. 30) is as follows: generating an intermediate hash value based on the first compressed file package 2 hash value (i.e., the first hash value) and the hash values of the other compressed file packages on the same level (level 1), uploading the intermediate hash value on the blockchain, and acquiring a corresponding fourth hash value. The intermediate hash value may be used as a transaction to be uploaded, and the hash value returned with respect to the transaction is acquired from the blockchain, the hash value being just the fourth hash value; further, an intermediate hash value is generated based on the fourth hash value 1 and the third hash value 3 on the same level, the intermediate hash value is uploaded on the blockchain, and a corresponding fourth hash value, e.g., fourth hash value 2, is acquired; layer-by-layer iterations are performed until a new root hash value is obtained; further, each of the fourth hash values is used in place of each of the third hash values in the corresponding positions, as shown in FIG. 30.

It may be seen through the descriptions of steps S1-S3, and by comparing the examples of FIG. 29 and FIG. 30 that the tree-shaped structure updates a hash value associated with the updated file based on the updated file, which is a partial update for the overall tree-shaped structure data; that is, the hash values and compressed file packages not associated with the updated file keep unchanged; the problem of re-uploading all of the associated files and file certificates on the blockchain caused by updating a small number of files is partially overcome; the shared-file updating efficiency is improved.

Step S2703: using the fourth hash value on the highest level as a new root hash value, and sending the new root hash value.

Specifically, the fourth hash value on the highest level is used as the new root hash value (step S3004 as shown in FIG. 30, corresponding to step S2904 as shown in FIG. 29); further, the new root hash value is sent; there are two methods for sending the new root hash value: 1) sending the new root hash value to an acquirer having an authority to acquire the shared files by a blockchain; 2) sending the new root hash value to an acquirer having an authority to acquire the shared files in other manners, for example, an official email, and so no; it may be understood that the new root hash value is sent to an acquirer having an authority to acquire the shared files, and the acquirer having the authority may be one or more parties; for example, the updated files are statements produced by bank A and bank B within a predefined time range; the new root hash value is produced after step S2701-step S2703, and then the root hash value is sent to the bank A and the bank B having the authorities to acquire these statement files; obviously, the security of the files is improved in a manner of a new hash value.

Figure 28:
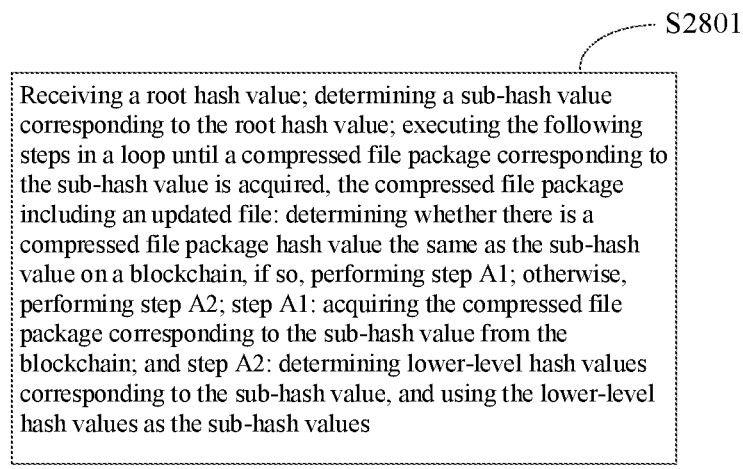
FIG. 28 is a schematic diagram of a flow of acquiring an updated file provided by the fourth embodiment of the disclosure.

As shown in FIG. 28, the fourth embodiment of the disclosure provides a method for acquiring updated shared files, and the method may comprise the following steps:

Step S2801: receiving a root hash value; determining a sub-hash value corresponding to the root hash value; executing the following steps in a loop until a compressed file package corresponding to the sub-hash value is acquired, the compressed file package including an updated file: determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

Specifically, the descriptions of the method for acquiring files in an updated compressed file package corresponding to the updated compressed file package hash value from the blockchain in accordance with the new root hash value are consistent with the descriptions of the examples of step S3101-step S3104, and no unnecessary details are further given herein; further, the step of acquiring an updated file in an updated compressed file package corresponding to the sub-hash value comprises: acquiring an updated compressed file package corresponding to the sub-hash value, and decompressing and deciphering the updated compressed file package to acquire the updated file in the file package. Specifically, each of the acquired compressed file packages is decompressed and deciphered, and the decompressing and deciphering methods correspond to the compressing and enciphering methods.

As shown in FIG. 31, the fourth embodiment of the disclosure provides a method for acquiring updated shared files based on hash values of a tree-shaped structure, and the structure may comprise the following steps:

Step S3101: in accordance with a received hash value.

Specifically, a root hash value is received; a sub-hash value corresponding to the root hash value is determined; it may be understood that the root hash value is a new root hash value; in the example as shown in FIG. 31, the sub-hash values corresponding to the root hash value (i.e., new root hash value) are respectively the lower-level hash value 1 and the lower-level hash value 2.

Step S3102-step S3103: executing the operations of acquiring lower-level hash values in a loop.

The step of making executions in a loop until a compressed file package including an updated file corresponding to the sub-hash value is acquired is described below by step S3102-step S3103; specifically, as shown in FIG. 5, it is first judged whether the corresponding sub-hash value is a hash value of the compressed file package including the updated file, and as for the lower-level hash value 1: it is determined that there is no compressed file package hash value the same as the sub-hash value (level 2, lower-level hash value 1) on the blockchain, the compressed file package including the updated file; then lower-level hash values corresponding to the sub-hash value (level 2, lower-level hash value 1) are determined, and the lower-level hash values are used as the sub-hash values, for example, it is determined that the respective sub-hash values corresponding to the lower-level hash value 1 are the lower-level hash value 1 and the lower-level hash value 2 (belonging to the level 3).

It is further judged whether the corresponding sub-hash value is a hash value of a compressed file package including the updated file; as for the lower-level hash level 2: it is determined that there is no compressed file package hash value the same as the current hash value (level 2: lower-level hash value 2) on the blockchain, and it may be seen from the example of FIG. 5 that the lower-level hash value 2 on the level 2 is the same as the compressed file package 2.

Similarly, it is further determined that the respective sub-hash values corresponding to the lower-level hash value 1 (level 2) are the lower-level hash value 1 (level 3) and the lower level hash value 2 (on level 3); further, it is determined there is a compressed file package hash value (updated compressed file package 2 hash value, the updated compressed file package including the updated file) the same as the current hash value (level 4: lower-level hash value 2) on the blockchain; it may be understood that after the updated compressed file package is found, the traversing operation may be stopped; that is, a root hash value is received; a sub-hash value corresponding to the root hash value is determined; the following steps are executed in a loop until a compressed file package corresponding to the sub-hash value is acquired, the compressed file package including an updated file; determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

Step S3104: acquiring an updated compressed file package and an updated file.

Specifically, an updated compressed file package is acquired in accordance with step S3101-step S3103; further, the step of acquiring the compressed file package corresponding to the current hash value comprises: acquiring the compressed file package corresponding to the current hash value, and decompressing and deciphering the compressed file package to acquire the files in the compressed file package; specifically, each of the acquired compressed file packages is decompressed and deciphered, and the decompressing and deciphering methods correspond to the compressing and enciphering methods.

Figure 32:
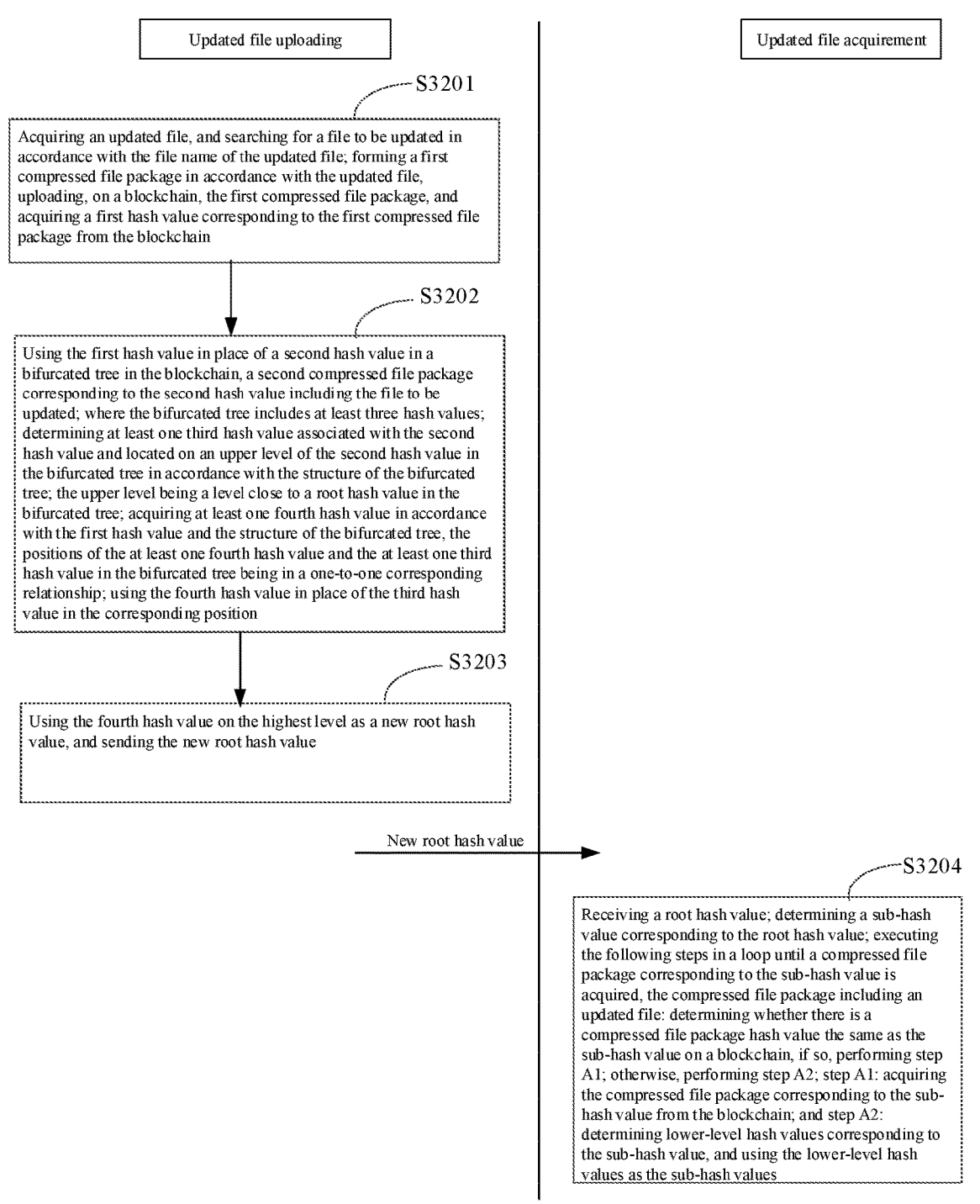
FIG. 32 is a schematic diagram of a flow of acquiring an updated shared file provided by the fourth embodiment of the disclosure.

As shown in FIG. 32, the fourth embodiment of the disclosure provides a flow of updating shared files, and the flow comprises the following steps:

In the schematic flowchart as shown in FIG. 32, step S3201-step S3203 are used to describe a process of updating files and a process of generating and uploading the associated hash values; step S3204 is used to describe a process of acquiring updated shared files by a shared file acquirer; for example, bank headquarters may upload the shared files, and the shared file acquirer may be an enterprise directly related to the shared files in terms of the service, for example, bank 1, bank 2, bank 3, and so on.

Step S3201: acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain.

Specifically, the descriptions relating to the first compressed file package including the updated file are consistent with the descriptions of step S2701, and no unnecessary details are further given herein; further, the step of forming a first compressed file package in accordance with the updated file comprises: searching for a second file package where the file to be updated is located in accordance with the file name of the updated file, and in case the second file package includes other files than the file to be updated, generating a first file package in accordance with the other files and the updated file. Furthermore, the first file package is compressed and enciphered to form the first compressed file package.

Step S3202: using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position.

Specifically, the descriptions relating to using the updated compressed file package and the associated hash values instead are consistent with the descriptions of step S2701, and no unnecessary details are further given herein.

Step S3203: uploading each of the first hash value and the fourth hash value on the blockchain, using the fourth hash value on the highest level as a new root hash value, and sending the new root hash value.

Specifically, the descriptions relating to generating the new root hash value are consistent with the descriptions of step S2703, and no unnecessary details are further given herein.

Step S3204: receiving a root hash value; determining a sub-hash value corresponding to the root hash value; executing the following steps in a loop until a compressed file package corresponding to the sub-hash value is acquired, the compressed file package including an updated file: determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

Specifically, the descriptions relating to acquiring the lower-level hash values corresponding to the updated root hash value in accordance with the updated new root hash value are consistent with the descriptions of step S2801, and no unnecessary details are further given herein. Further, the step of acquiring an updated file in an updated compressed file package corresponding to the sub-hash value comprises: acquiring an updated compressed file package corresponding to the sub-hash value, and decompressing and deciphering the updated compressed file package to acquire the updated file in the file package.

Figure 33:
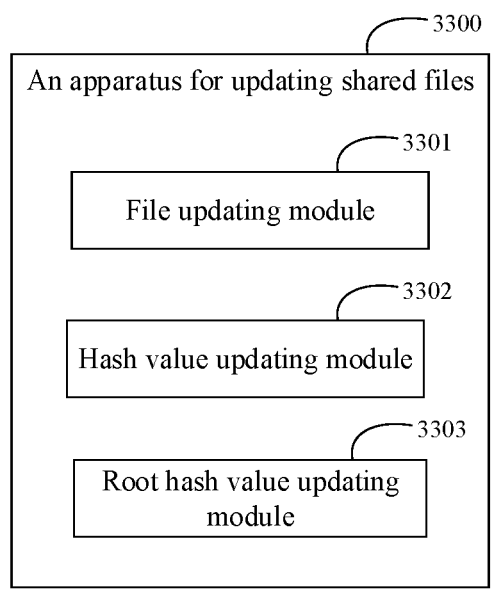
FIG. 33 is a schematic diagram of a structure of an apparatus for updating shared files provided by the fourth embodiment of the disclosure.

As shown in FIG. 33, the fourth embodiment of the disclosure provides an apparatus for updating shared files 3300, comprising: a file updating module 3301, a hash value updating module 3302 and a root hash value updating module 3303; wherein, the file updating module 3301 is used for acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain;

the hash value updating module 3302 is used for using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position; and the root hash value updating module 3303 is used for using the fourth hash value on the highest level as a new root hash value, and sending the new root hash value.

Optionally, the file updating module 3301 further comprises: searching for a second file package where the file to be updated is located in accordance with the file name of the updated file, and in case the second file package includes other files than the file to be updated, generating a first file package in accordance with the other files and the updated file.

Optionally, the file updating module 3301 is further used for compressing and enciphering the first file package to form the first compressed file package.

Figure 34:
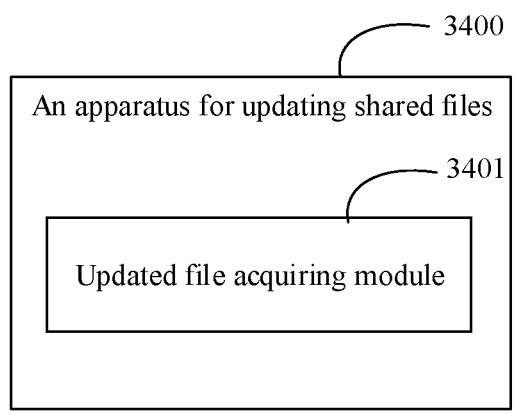
FIG. 34 is a schematic diagram of an apparatus for acquiring updated shared files provided by the fourth embodiment of the disclosure.

As shown in FIG. 34, the fourth embodiment of the disclosure provides an apparatus for updating shared files 3400, comprising: an updated file acquiring module 3401; wherein, the updated file acquiring module 3401 is used for receiving a root hash value; determining a sub-hash value corresponding to the root hash value; executing the following steps in a loop until a compressed file package corresponding to the sub-hash value is acquired: determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

Optionally, the updated file acquiring module 3401 is further used for acquiring an updated file in an updated compressed file package corresponding to the sub-hash value, which comprises: acquiring an updated compressed file package corresponding to the sub-hash value, and decompressing and deciphering the updated compressed file package to acquire the updated file in the file package.

Figure 35:
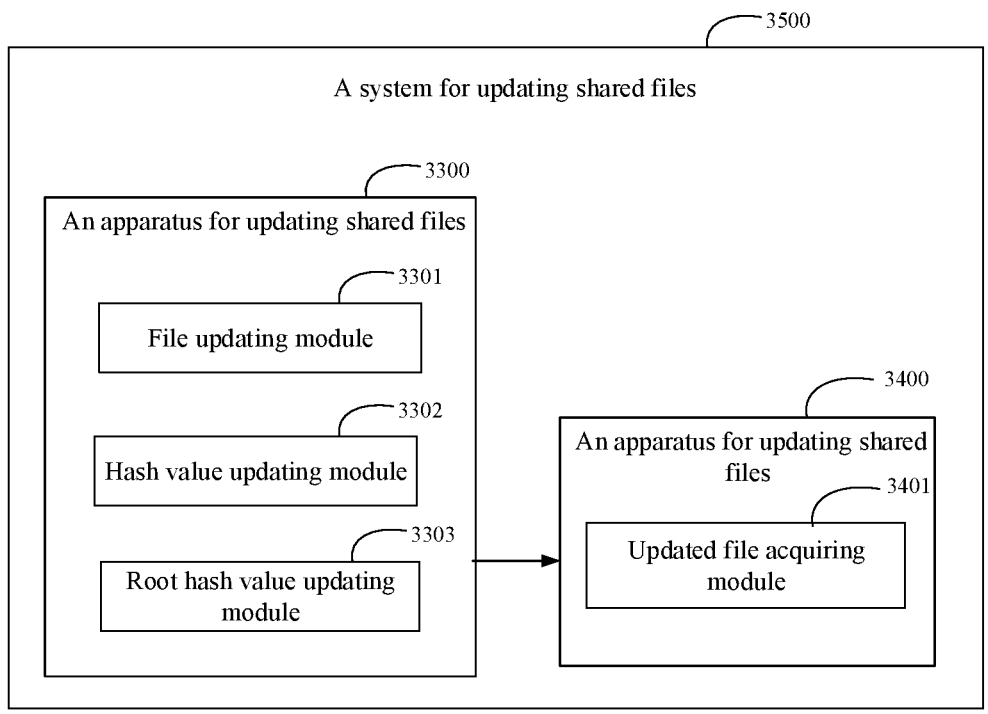
FIG. 35 is a schematic diagram of a structure of a system for acquiring updated shared files provided by the fourth embodiment of the disclosure.

As shown in FIG. 35, the fourth embodiment of the disclosure provides a system for updating shared files 3500, comprising: an apparatus for updating shared files 3300 and an apparatus for updating shared files 3400.

The fourth embodiment of the disclosure further provides a shared file updating electronic device, comprising: one or more processors; and a storage means for storing one or more programs, the one or more programs, when executed by the one or more processors, causing the one or more processors to implement a method provided by any of the aforesaid embodiments.

The fourth embodiment of the disclosure further provides a computer-readable medium, on which medium a computer program is stored, the program, when executed by a processor, implementing a method provided by any of the aforesaid embodiments.

Figure 36:
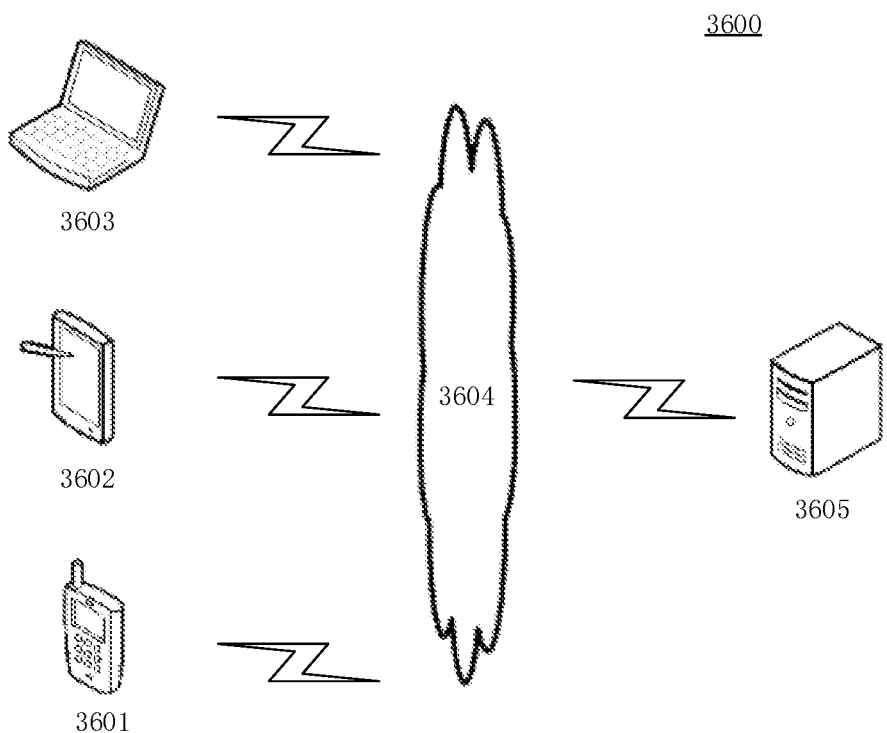
FIG. 36 is an exemplary system architecture diagram to which an embodiment of the disclosure can be applied.

FIG. 36 shows an exemplary system architecture 3600 to which a method for sharing files or an apparatus for sharing files according to an embodiment of the disclosure can be applied.

As shown in FIG. 36, the system architecture 3600 may comprise terminal devices 3601, 3602 and 3603, a network 3604, and a server 3605. The network 3604 is a medium for providing a communication link between the terminal devices 3601, 3602 and 3603 and the server 3605. The network 3604 may include various connection types, such as wired or wireless communication links, or fiber-optic cables.

The user may use the terminal devices 3601, 3602 and 3603 to interact with the server 3605 through the network 3604 to receive or send messages and so on. Various client applications, such as enterprise application clients, web browser applications, search applications, instant messaging tools, email clients, and so on, may be installed on the terminal devices 3601, 3602 and 3603.

The terminal devices 3601, 3602 and 3603 may be various electronic devices having screens and supporting running of multiple client applications, including but not limited to smart phones, tablet computers, laptop portable computers, desktop computers, and so on.

The server 3605 may be a server that provides various services, such as a background management server that provides support for a file acquiring request proposed by the user using the terminal devices 3601, 3602 and 3603. The background management server may upload and store files to be shared, process the proposed file acquiring request, and return the files back to the terminal devices.

It shall be noted that the method for sharing files provided by the embodiment of the disclosure is generally performed by the server 3605, and correspondingly, the apparatus for sharing files is generally provided in the server 3605.

It should be understood that the numbers of the terminal devices, the networks, and the servers in FIG. 36 are merely schematic. According to implementation requirements, there may be any numbers of terminal devices, networks, and servers.

Figure 37:
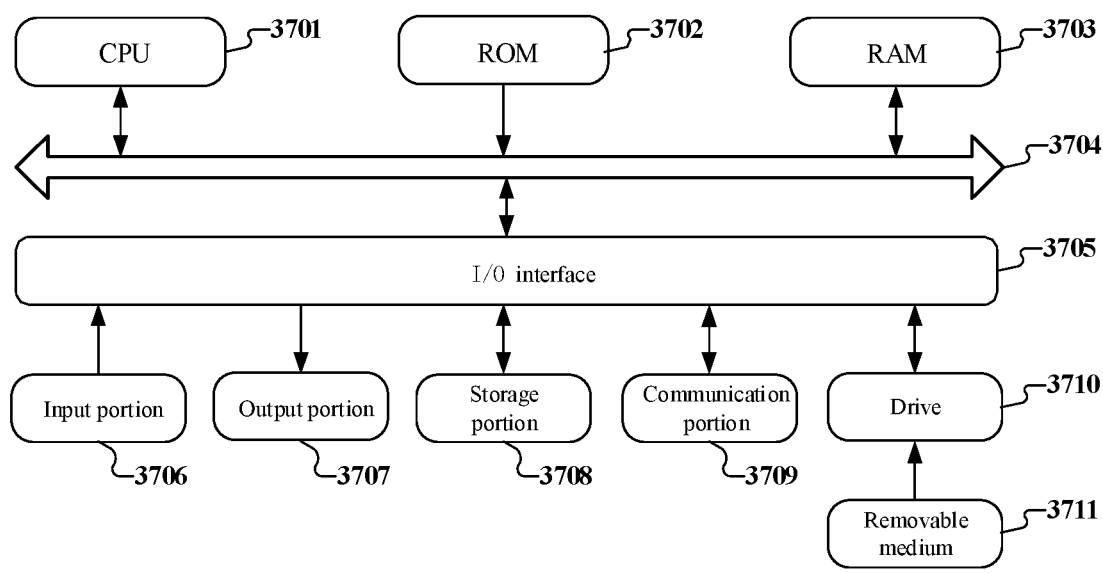
FIG. 37 is a schematic diagram of a structure of a computer system suitable for implementing a terminal device or a server according to an embodiment of the disclosure.

Reference is now made to FIG. 37, which shows a schematic diagram of a structure of a computer system 3700 suitable for implementing a terminal device according to an embodiment of the disclosure. The terminal device shown in FIG. 37 is only an example, and shall not impose any limitation on the functions and the scope of use of the embodiment of the disclosure.

As shown in FIG. 37, the computer system 3700 includes a central processing unit (CPU) 3701, which may perform various appropriate actions and processes according to a program stored in a read-only memory (ROM) 3702 or a program loaded from a storage portion 3708 into a random access memory (RAM) 3703. Various programs and data required for the operation of the system 3700 are also stored in the RAM 3703. The CPU 3701, the ROM 3702 and the RAM 3703 are connected to each other through a bus 3704. An input/output (I/O) interface 3705 is also connected to the bus 3704.

The following components are connected to the I/O interface 3705: an input portion 3706 including a keyboard, a mouse, and so on; an output portion 3707 including a cathode ray tube (CRT), a liquid crystal display (LCD) and so on, and a speaker and so on; a storage portion 3708 including a hard disk and so on; and a communication portion 3709 including a network interface card such as a LAN card, a modem, and so on. The communication portion 3709 performs communication processing via a network such as the Internet. A drive 3710 is also connected to the I/O interface 3705 according to requirements. A removable medium 3711, such as a magnetic disk, an optical disk, a magneto-optical disk, a semiconductor memory, and so on, is installed on the drive 3710 according to requirements so that a computer program read therefrom is installed in the storage portion 3708 according to requirements.

In particular, according to the embodiment disclosed in the disclosure, the process described above with reference to the flowchart may be implemented as a computer software program. For example, the embodiment disclosed in the disclosure includes a computer program product, which includes a computer program carried on a computer-readable medium, the computer program containing a program code for performing the method shown in the flowchart. In such embodiment, the computer program may be downloaded and installed from the network through the communication portion 3709, and/or installed from the removable medium 3711. When the computer program is executed by the central processing unit (CPU) 3701, the aforesaid functions defined in the system according to the disclosure are executed.

It shall be noted that the computer-readable medium shown in the disclosure may be a computer-readable signal medium or a computer-readable storage medium or any combination of the aforesaid two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt multiple forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program used by or in combination with the instruction execution system, apparatus or device. The program code contained on the computer-readable medium may be transmitted using any appropriate medium, including but not limited to wireless, wire, optical cable. RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules and/or units involved in the embodiments of the disclosure may be implemented by software or hardware. The described modules and/or units may be also provided in a processor. For example, descriptions may be made as follows: a processor comprises a compressed file package uploading module, a node hash value acquiring module and a root hash value acquiring module; wherein the names of these modules do not form limitations of the modules themselves in some cases. For example, the compressed file package uploading module may be also described as a "module for forming a compressed file package and executing an uploading operation in accordance with a received file". Descriptions may be also given as follows: a processor comprises an on-chain file acquiring module; wherein the name of the module does not form limitations of the module itself in some cases. For example, the on-chain file acquiring module may be also described as a "module for acquiring files included in a compressed file package in accordance with a compressed file package hash value".

As another aspect, the disclosure also provides a computer-readable medium, which may be included in the devices described in the aforesaid embodiments, or may exist independently without being assembled into the devices. The aforesaid computer-readable medium carries one or more programs, and the one or more programs, when executed by one of the devices, cause the device to include:

acquiring files to be shared, and forming at least two compressed file packages; uploading, on a blockchain, the at least two compressed file packages, and acquiring at least two first hash values respectively corresponding to the at least two compressed file packages from the blockchain; using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and using the current hash value as a root hash value, and sending the root hash value.

receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining two lower-level hash values corresponding to the current hash value, and using the lower-level hash values as the current hash values.

acquiring files to be shared, and forming a plurality of compressed file packages; uploading, on a blockchain, the compressed file packages, and acquiring at least three first hash values corresponding to the compressed file packages from the blockchain; using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the set number, uploading the intermediate hash value on the blockchain, and acquiring a corresponding second hash value from the blockchain; using the second hash values as the current hash values; the set number being an integer greater than 2; and using the current hash value as a root hash value, and sending the root hash value.

receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

acquiring files to be shared within a set period, and forming a plurality of compressed file packages; grouping the plurality of compressed file packages, and obtaining at least two groups of compressed file packages; uploading, on a blockchain, each group of the compressed file packages, and acquiring first hash values corresponding to the compressed file packages included in each group from the blockchain; generating intermediate hash values based on the first hash values included in each group, uploading each of the intermediate hash values on the blockchain, and respectively acquiring second hash values from the blockchain; using the second hash values as current hash values, and executing the following operations in a loop until the number of the current hash values is 1: selecting a predefined number of current hash values from the at least two current hash values, generating an intermediate hash value based on the selected predefined number of current hash values, uploading the intermediate hash value on the blockchain, and acquiring a corresponding second hash value from the blockchain; generating an intermediate hash value based on the current hash values that have not been selected in case there are the current hash values that have not been selected and the number of the current hash values that have not been selected is less than the predefined number, uploading the intermediate hash value on the blockchain, and acquiring a corresponding second hash value from the blockchain; using the second hash values as the current hash values; the predefined number being an integer greater than 1; and using the current hash value as a root hash value, and sending the root hash value.

receiving a current hash value; executing the following steps in a loop until a compressed file package corresponding to the current hash value is acquired: determining whether there is a compressed file package hash value the same as the current hash value on a blockchain, if so, performing step A1; otherwise, performing step A2; step A1: acquiring the compressed file package corresponding to the current hash value from the blockchain; and step A2: determining respective lower-level hash values corresponding to the current hash value, and using the lower-level hash values as the current hash values.

acquiring an updated file, and searching for a file to be updated in accordance with the file name of the updated file; forming a first compressed file package in accordance with the updated file, uploading, on a blockchain, the first compressed file package, and acquiring a first hash value corresponding to the first compressed file package from the blockchain; using the first hash value in place of a second hash value in a bifurcated tree in the blockchain, a second compressed file package corresponding to the second hash value including the file to be updated; where the bifurcated tree includes at least three hash values; determining at least one third hash value associated with the second hash value and located on an upper level of the second hash value in the bifurcated tree in accordance with the structure of the bifurcated tree; the upper level being a level close to a root hash value in the bifurcated tree; acquiring at least one fourth hash value in accordance with the first hash value and the structure of the bifurcated tree, the positions of the at least one fourth hash value and the at least one third hash value in the bifurcated tree being in a one-to-one corresponding relationship; using the fourth hash value in place of the third hash value in the corresponding position; and using the fourth hash value on the highest level as a new root hash value, and sending the new root hash value.

receiving a root hash value; determining a sub-hash value corresponding to the root hash value; executing the following steps in a loop until a compressed file package corresponding to the sub-hash value is acquired, the compressed file package including an updated file: determining whether there is a compressed file package hash value the same as the sub-hash value on a blockchain, if so, performing step A1; otherwise, performing step A2; step A1: acquiring the compressed file package corresponding to the sub-hash value from the blockchain; and step A2: determining lower-level hash values corresponding to the sub-hash value, and using the lower-level hash values as the sub-hash values.

According to the technical solutions of the embodiments of the disclosure, since a technical means of compressing a plurality of files into file packages is adopted, the technical problem of an excessive network resource burden caused by a large number of files is partially overcome, and the file uploading and sharing (including updating) efficiencies are improved by uploading the respective compressed file packages concurrently; a plurality of data structures are used to store the hash values and share the hash values to thereby acquire the shared files, which improves the security of the shared files.

The aforesaid specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. A method for sharing files, comprising:
acquiring files to be shared, and forming at least two compressed file packages;
uploading, on a blockchain, the at least two compressed file packages, and acquiring at least two first hash values respectively corresponding to the at least two compressed file packages from the blockchain;
using the at least two first hash values as current hash values, and executing the following operations in a loop until the number of the current hash values is 1: selecting the current hash values in pairs from the at least two current hash values, generating an intermediate hash value based on the selected one pair of current hash values, uploading the intermediate hash value on the blockchain, and acquiring a corresponding second hash value from the blockchain; using the second hash value as the current hash value; and
using the current hash value as a root hash value, and sending the root hash value to an acquirer having an authority to acquire the shared files by the blockchain.

2. The method of claim 1, wherein,
in case the number of the current hash values is even, selecting the current hash values in pairs from the at least two current hash values, generating an intermediate hash value based on the selected one pair of current hash values, uploading the intermediate hash value on the blockchain, and acquiring a corresponding second hash value from the blockchain; and
in case where the respective current hash values have been selected, using the second hash value as the current hash value.

3. The method of claim 1, wherein,
in case the number of the current hash values is odd other than 1, selecting the current hash values in pairs from the at least two current hash values, generating an intermediate hash value based on the selected one pair of current hash values, uploading the intermediate hash value on the blockchain, and acquiring a corresponding second hash value from the blockchain; and
in case where the number of the current hash values that have not been selected is 1, using the second hash value and the one hash value that has not been selected as the current hash values.

4. The method of claim 1, wherein,
the step of acquiring files to be shared, and forming at least two compressed file packages comprises:
acquiring files to be shared within a predefined time range, forming at least two file packages, and determining the number of files in the file packages in accordance with a network bandwidth.

5. The method of claim 4, wherein,
compressing and enciphering the file packages respectively to form the compressed file packages.

6. The method of claim 1, wherein,
uploading the compressed file packages on the blockchain concurrently.

7. The method of claim 1, further comprising:
receiving a current hash value; executing the following steps in a loop until a compressed file package corresponding to the current hash value is acquired:
determining whether there is a compressed file package hash value the same as the current hash value on a blockchain, if so, performing step A1; otherwise, performing step A2;
step A1: acquiring the compressed file package corresponding to the current hash value from the blockchain; and
step A2: determining respective lower-level hash values corresponding to the current hash value, and using the lower-level hash values as the current hash values.

8. The method of claim 7, wherein,
the step of acquiring the compressed file package corresponding to the current hash value comprises:
acquiring the compressed file package corresponding to the current hash value, and decompressing and deciphering the compressed file package to acquire files in the compressed file package.

9. A method for sharing files, comprising:
acquiring files to be shared, and forming a plurality of compressed file packages;
uploading, on a blockchain, the compressed file packages, and acquiring at least three first hash values corresponding to the compressed file packages from the blockchain;
using the first hash values as current hash values, and executing the following operations in a loop until the number of the current hash values is 1: respectively selecting a set number of current hash values from the at least three current hash values, generating an intermediate hash value based on the selected set number of current hash values, uploading the intermediate hash value on the blockchain, and acquiring a corresponding second hash value from the blockchain; generating an intermediate hash value based on the current hash values that have not been selected in case a number of the current hash values that have not been selected is greater than zero and less than the set number, uploading the intermediate hash value on the blockchain, and acquiring a corresponding second hash value from the blockchain; using the second hash values as the current hash values; the set number being an integer greater than 2; and
using the current hash value as a root hash value, and sending the root hash value to an acquirer having an authority to acquire the shared files by the blockchain.

10. The method of claim 9, comprising:
receiving a current hash value;
until a compressed file package corresponding to the current hash value is acquired, executing operations in a loop, the operations including:
determining whether the blockchain comprises a compressed file package hash value that is the same as the current hash value;
acquiring the compressed file package corresponding to the current hash value from the blockchain, if it is determined that the blockchain comprises the compressed file package hash value is the same as the current hash value; and
determining a respective lower-level hash value corresponding to the current hash value, and using the lower-level hash value as the current hash value, if it is determined that all compressed file package hash values on the blockchain is different from the current hash value.

11. The method of claim 10, wherein said acquiring the compressed file package corresponding to the current hash value comprises:
   acquiring the compressed file package corresponding to the current hash value; and
   decompressing and deciphering the compressed file package to acquire files in the compressed file package.

12. A method for sharing files, comprising:
   acquiring files to be shared within a set period, and forming a plurality of compressed file packages;
   grouping the plurality of compressed file packages, and obtaining at least two groups of compressed file packages; uploading, on a blockchain, each group of the compressed file packages, and acquiring first hash values corresponding to the compressed file packages included in each group from the blockchain;
   generating intermediate hash values based on the first hash values included in each group, uploading each of the intermediate hash values on the blockchain, and respectively acquiring second hash values from the blockchain;
   using the second hash values as current hash values, and executing the following operations in a loop until the number of the current hash values is 1:
      selecting a predefined number of current hash values from the at least two current hash values, the predefined number being an integer greater than 1, generating an intermediate hash value based on the selected predefined number of current hash values, uploading the intermediate hash value on the blockchain, and acquiring a corresponding second hash value from the blockchain;
      generating an intermediate hash value based on the current hash values that have not been selected in case a number of the current hash values that have not been selected is greater than zero and less than the predefined number, uploading the intermediate hash value on the blockchain, and acquiring a corresponding second hash value from the blockchain;
      using the second hash values as the current hash values; and
   using the current hash value as a root hash value, and sending the root hash value to an acquirer having an authority to acquire the shared files by the blockchain.

13. The method of claim 12, wherein,
   the step of grouping the plurality of compressed file packages, and obtaining at least two groups of compressed file packages comprises:
      using a plurality of compressed file packages formed within a set piecewise period as a group of compressed file packages, and obtaining at least two groups of compressed file packages, the set period including at least two set piecewise periods.

14. The method of claim 12, wherein,
   the step of grouping the plurality of compressed file packages, and obtaining at least two groups of compressed file packages comprises:
      grouping the plurality of compressed file packages in accordance with a set file number, and obtaining at least two groups of compressed file packages.

15. A method for updating shared files, comprising:
   acquiring an updated file, and searching for a file to be updated in accordance with the file name of the updated file;
   forming a first compressed file package in accordance with the updated file, uploading, on a blockchain, the first compressed file package, and acquiring a first hash value corresponding to the first compressed file package from the blockchain;
   using the first hash value in place of a second hash value in a bifurcated tree in the blockchain, a second compressed file package corresponding to the second hash value including the file to be updated;
   where the bifurcated tree includes at least three hash values;
   determining at least one third hash value associated with the second hash value and located on an upper level of the second hash value in the bifurcated tree in accordance with the structure of the bifurcated tree; the upper level being a level close to a root hash value in the bifurcated tree;
   acquiring at least one fourth hash value in accordance with the first hash value and the structure of the bifurcated tree, the positions of the at least one fourth hash value and the at least one third hash value in the bifurcated tree being in a one-to-one corresponding relationship;
   using the fourth hash value in place of the third hash value in the corresponding position; and using the fourth hash value on the highest level as a new root hash value, and sending the new root hash value to an acquirer having an authority to acquire the shared files by the blockchain.

16. The method of claim 15, wherein,
   the step of forming a first compressed file package in accordance with the updated file comprises:
      searching for a second file package where the file to be updated is located in accordance with the file name of the updated file, and in case the second file package includes other files than the file to be updated, generating a first file package in accordance with the other files and the updated file.

17. An electronic device, the electronic device comprises:
   one or more processors; and
   a storage means for storing one or more programs,
   the one or more programs, when executed by the one or more processors, causing the one or more processors to implement the method according to claim 1.

18. A non-transitory computer-readable medium storing instructions that, when executed by one or more processor, causing the one or more processor to implement the method according to claim 1.

* * * * *